(12) United States Patent
Sodini et al.

(10) Patent No.: US 7,349,574 B1
(45) Date of Patent: Mar. 25, 2008

(54) SYSTEM AND METHOD FOR PROCESSING NON-LINEAR IMAGE DATA FROM A DIGITAL IMAGER

(75) Inventors: Charles G. Sodini, Belmont, MA (US); Jason Y. Sproul, Watertown, MA (US); Edward T. Chang, Cambridge, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 931 days.

(21) Appl. No.: 10/685,126

(22) Filed: Oct. 14, 2003

Related U.S. Application Data

(60) Provisional application No. 60/417,862, filed on Oct. 11, 2002.

(51) Int. Cl.
*G06K 9/00* (2006.01)
(52) U.S. Cl. .................................. 382/168; 345/589
(58) Field of Classification Search ........ 382/168–172, 382/312, 321; 345/589–605
See application file for complete search history.

(56) References Cited

U.S. PATENT DOCUMENTS

| 6,421,084 | B1 | 7/2002 | Chang et al. |
| 6,614,562 | B1 | 9/2003 | Minemier |
| 7,184,066 | B2 * | 2/2007 | Elliot et al. .................. 345/694 |

OTHER PUBLICATIONS

"A 256×256 CMOS Imaging Array with Side Dynamic Range Pixels and Column-Parallel Digital Output," Decker et al. *IEEE Journal of Solid-State Circuits.* Dec. 1998. vol. 33, No. 12.

"Autobrite: Method for Controlling the Dynamic Range of an Image Sensor," *SMAL Camera Technologies.* Dec. 7, 2001.

"Color Filter Array Recovery Using a Threshold-based Variable Number of Gradients," Chang et al. *Compaq Computer Corpporation.* Cambridge Research Lab, Cambridge, MA., 1999.

\* cited by examiner

*Primary Examiner*—Jose L. Couso
(74) *Attorney, Agent, or Firm*—Russell E. Baumann

(57) ABSTRACT

A system and method process non-linear image data, still or video, from a digital imager. Noise generated by analog-to-digital converters is filtered from a pixel of digital image data. Moreover, the effects of single pixel defects in the imager are eliminated by clamping a predetermined pixel of image data within the window when the value of the predetermined pixel is greater than a maximum value of the image data of neighboring pixels or less than a minimum value of the image data of neighboring pixels. Ripples in image data are reduced by eliminating the effects of single pixel defects before filtering for crosstalk caused by electrical crosstalk between sensor elements in an imager. Dark current is removed from image data generated by an imager by subtracting a fraction of a determined dark current value from all image data generated by the imager to compensate for nonlinearities in dark current across the imager. The image data is white balanced by creating a set of scalar color adjustments from determined average color values and constraining the set of scalar adjustments to plausible lighting conditions to prevent overcompensation on images having large regions of similar hue. Lastly, utilization of a fixed set of intensity levels is optimized by remapping and restreching the image data to create new luma values for each pixel.

13 Claims, 10 Drawing Sheets

SYSTEM AND METHOD FOR PROCESSING
NON-LINEAR IMAGE DATA FROM A
DIGITAL IMAGER

PRIORITY INFORMATION

This application claims priority from U.S. Provisional Patent Application Ser. No. 60/417,862, filed on Oct. 11, 2002. The entire contents of U.S. Provisional Patent Application Ser. No. 60/417,862, are hereby incorporated by reference.

FIELD OF THE PRESENT INVENTION

The present invention is directed to processing non-linear image data, still or video, from a digital imager. More specifically, the present invention is directed to providing noise removal processes, linear mapping processes, and white balance processes for preparing non-linear image data from a digital imager for display or further analysis.

BACKGROUND OF THE PRESENT INVENTION

Conventionally, image data from digital imagers are processed in some fashion to provide a quality digital representation of the scene being imaged. FIG. 1 illustrates a conventional image process pipeline from the imager to a display system or other system that requires a quality digital representation of the imaged scene.

As illustrated in FIG. 1, an imager 1; comprising a plurality of photosensitive elements commonly referred to as pixels, the physical realization of the pixels being either a plurality of phototransistors or a plurality of photodiodes functioning as light-detecting elements; images a scene and produces a plurality of voltages. In operation a conventional pixel is first reset with a reset voltage that places an electronic charge across the capacitance associated with; e.g., a photodiode. Electronic charge produced by the photodiode when exposed to illumination, causes charge of the diode capacitance to dissipate in proportion to the incident illumination intensity of the scene. At the end of an exposure period, the change in diode capacitance charge is detected and the photodiode is reset. The amount of light detected by the photodiode is computed as the difference between the reset voltage and the voltage corresponding to the final diode capacitance charge.

The voltages generated by the imager 1 are fed to an analog to digital converter 3. The analog to digital converter 3 converts each analog voltage to a digital image data word having a digital value in a range from 0, which conventionally represents no illumination, to some maximum value that represents illumination saturation. If the width of the digital image data word were set to 8-bits, the range of digital values that a digital image data word could realize would be in the range 0 to 255, 0 being no illumination and 255 being saturation.

The digital image data word is then filtered by a filtering subsystem 5. The filtering subsystem 5, in most conventional systems, modifies the digital image data to compensate for any imager characteristic artifacts that were produced by the imager 1 or to compensate the digital image data for defective pixels in the imager 1.

After filtering, the filtered digital image data is processed in an image processing subsystem 7 wherein the digital image data is modified to compensate for dark current, crosstalk, and/or white balance. The filtered digital image data may also be decompressed in the image processing subsystem 7 if the sensor data received from the imager has been compressed. The processed digital image data is further corrected in an image correction subsystem 9. The image correction subsystem 9 may provide gamma correction, color correction, and/or sharpening. The corrected digital image data is then fed to a number of possible subsystems that can further prepare the image data for display, printing, or analysis.

Notwithstanding the various stages of filtering, processing, and correcting in a conventional image data pipeline, the image data may still have various quality issues with respect to noise introduced by the imager or other components along the pipeline. Moreover, utilizing conventional image processing systems, like the one illustrated in FIG. 1, the image data may not be properly compensated for with respect to the lighting conditions used to image the scene or the sensor color responsivity.

It is, therefore, desirable to provide an image-processing pipeline that produces image data of a high quality and that substantially removes any noise or artifacts introduced by the imager or other components along the pipeline. It is also desirable to provide an image processing pipeline that produces image data of a high quality and that substantially compensates the image data with respect to the lighting conditions used to image the scene or the sensor color responsivity.

SUMMARY OF THE PRESENT INVENTION

A first aspect of the present invention is a method for removing undesirable signal characteristics from a pixel of still digital image data generated by analog-to-digital converters. The method applies a predetermined voltage to each analog-to-digital converter to generate test outputs; calculates, from the test outputs, a relative offset value for each analog-to-digital converter; determines a maximum relative offset value from the calculated relative offset values; stores the maximum relative offset value; stores the calculated relative offset values such that each analog-to-digital converter has an associated stored calculated relative offset value; adds the stored maximum relative offset value to a pixel of still digital image data generated by an analog-to-digital converter; and subtracts the stored calculated relative offset value associated with the analog-to-digital converter from the sum of the stored maximum relative offset value and the pixel of still digital image data generated by the associated analog-to-digital converter.

A second aspect of the present invention is a method for removing undesirable signal characteristics from a pixel of video digital image data generated by analog-to-digital converters. The method applies a predetermined voltage to each analog-to-digital converter to generate test outputs; calculates, from the test outputs, a relative offset value for each analog-to-digital converter; compares the calculated relative offset value for an associated analog-to-digital converter with a previously stored calculated relative offset value for the associated analog-to-digital converter; increments the previously stored calculated relative offset value by a predetermined amount if it is determined that the calculated relative offset value for the associated analog-to-digital converter is greater than the previously stored calculated relative offset value for an associated analog-to-digital converter and storing a new relative offset value for an associated analog-to-digital converter therefrom; decrements the previously stored calculated relative offset value for the associated analog-to-digital converter by the predetermined amount if it is determined that the calculated relative offset value is less than the previously stored calculated relative offset value for the associated analog-to-digital converter and storing a new relative offset value for an associated analog-to-digital converter therefrom; determines a maximum relative offset value from the stored relative offset values and storing the determined maximum relative offset value; adds the stored maximum relative offset value to a pixel of video digital image data generated by an analog-to-digital converter; and subtracts the stored relative offset value associated with the analog-to-digital converter from the sum of the stored maximum relative offset value and the pixel of video digital image data generated by the associated analog-to-digital converter.

A third aspect of the present invention is a method for eliminating effects of single pixel defects in the imager. The method provides a predetermined size window of neighboring pixels and clamps a predetermined pixel of image data within the window when the value of the predetermined pixel is greater than a maximum value of the image data of neighboring pixels or less than a minimum value of the image data of neighboring pixels.

A fourth aspect of the present invention is a method for removing dark current from image data generated by an imager. The method shields a pair of columns of pixels at an edge of an image array; reads image data from the shielded pair of columns; averages the read image data to generate a dark current value; and subtracts a fraction of the dark current value from all image data generated by the imager to compensate for nonlinearities in dark current across the imager.

A fifth aspect of the present invention is a method for white balancing image data from an imager. The method samples a predetermined pattern of predetermined sized pixel blocks; chooses a pixel for each color from each sampled pixel block; averages the chosen pixels of a particular to determine an average color value for the color; creates a set of scalar color adjustments from the average color values, a scalar color adjustment for each color; constrains the set of scalar adjustments to plausible lighting conditions to prevent overcompensation on images having large regions of similar hue; normalizes the constrained set of scalar adjustments; and applies the normalized set of scalar adjustments to the image data.

Another aspect of the present invention is a method for optimally utilizing a fixed set of intensity levels of a video display to represent a wide dynamic range data captured by an imager. The method determines a target grey value; determines a power curve from the determined target grey value; limits the determined power curve to a range of minimum and maximum power curves, the range of minimum and maximum power curves corresponding to an original compression curve utilized by the imager; remaps a luma value of each pixel using the limited power curve; determines a minimum luma value $BP_{min}$ for a frame of image data; creates a histogram from the remapped luma values; determines an ideal black point value BP and an ideal white point value WP from the created histogram and determined minimum luma value; and restretches the image data, using the determined ideal black point value and an ideal white point value, to create new luma values for each pixel.

A further aspect of the present invention is a method of optimally utilizing a fixed set of intensity levels of a video display to represent a wide dynamic range data captured by an imager. The method determines a target grey value; determines a power curve from the determined target grey value; converts luma values into logarithmic luma values, the logarithmic luma values being independent of an input data range; determines a power function based upon a ratio between a desired logarithmic luma average and an actual logarithmic luma average; determines a maximum gain limit; determines a correct luma value; determines a luma correction value from the correct luma value and the actual luma value; and applies the luma correction value to each pixel input luma value to generate a corrected pixel input luma value.

Another aspect of the present invention is a method for determining a maximum input value for a captured scene. The method determines a range value corresponding to a determined maximum input value from a previous frame and a white point value; determines a scale value based upon a ratio of the range value and a predetermined portion of a number of bins B in a histogram; determines a shift value based on the determined scale value; determines a center point C for the histogram to be the white point when the determined maximum input value from a previous frame is greater than or equal to the white point; allows a center point for the histogram to move between the white point and a point equal to half the white point when the determined maximum input value from a previous frame is less than the white point; generates a histogram for incoming frame data; finds a white point bin $i'_W$ such that no more than 1% of the pixels are in bins above the white point bin $i'_W$; determines the desired white point W to be equal to $i'_W+C-(B/2)+1$; and adjusts a gain factor for the next frame based upon the determined desired white point W.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention, wherein.

DETAILED DESCRIPTION OF THE PRESENT INVENTION

Figure 1:
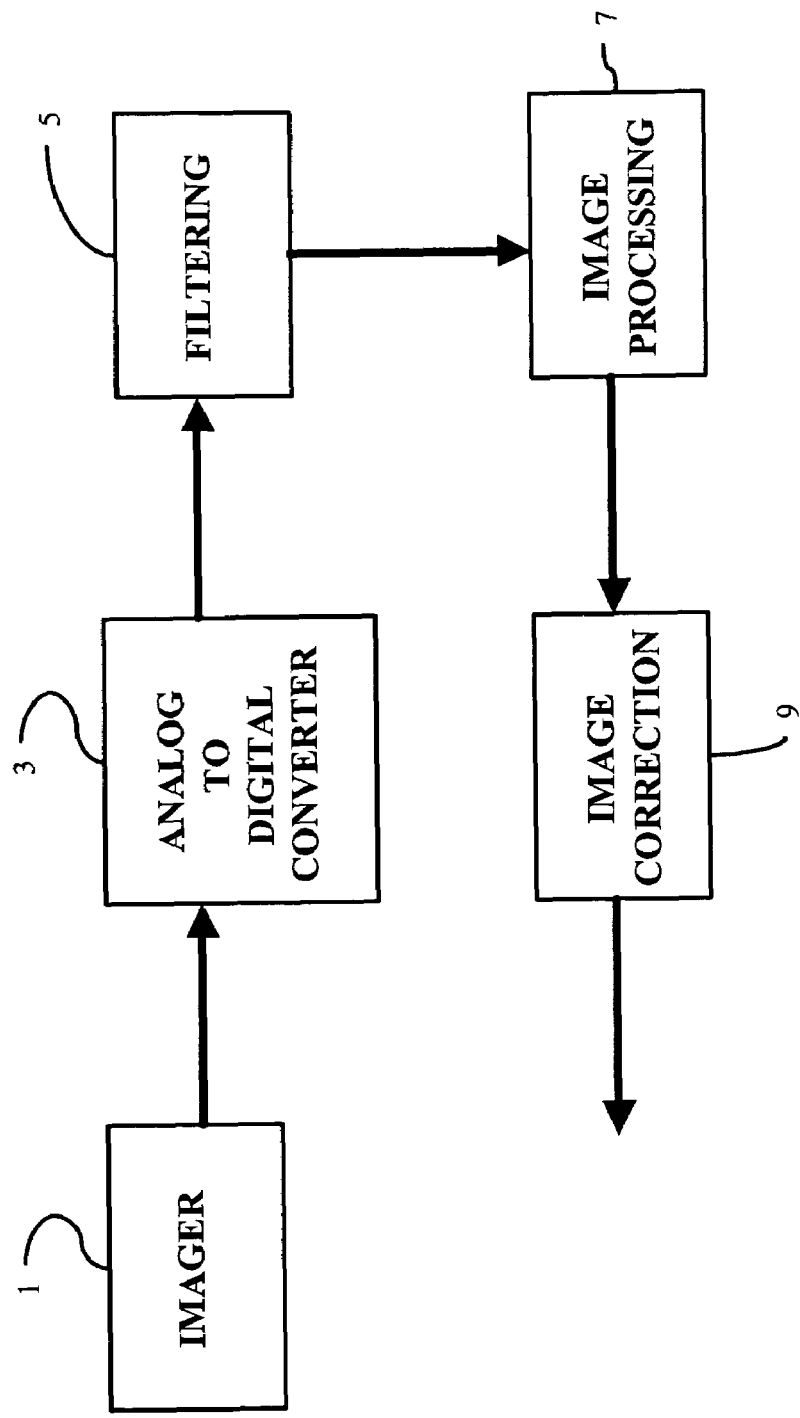
FIG. 1 is a block diagram showing a conventional image processing pipeline for processing digital image data from an imager.

The present invention will be described in connection with preferred embodiments; however, it will be understood that there is no intent to limit the present invention to the embodiments described herein. On the contrary, the intent is to cover all alternatives, modifications, and equivalents as may be included within the spirit and scope of the present invention as defined by the appended claims.

For a general understanding of the present invention, reference is made to the drawings. In the drawings, like reference have been used throughout to designate identical or equivalent elements. It is also noted that the various drawings illustrating the present invention are not drawn to scale and that certain regions have been purposely drawn disproportionately so that the features and concepts of the present invention could be properly illustrated.

As noted above, it is desirable to provide an image processing pipeline that produces image data of a high quality and that substantially removes any noise or artifacts introduced by the imager or other components along the pipeline. It is also desirable to provide an image-processing pipeline that produces image data of a high quality and has substantially compensated the image data with respect to the lighting conditions used to image the scene or the sensor color responsivity. Moreover, it is desirable to provide an image-processing pipeline that produces image data of a high quality and has substantially limited the amount of stretching done to flat images.

Figure 2:
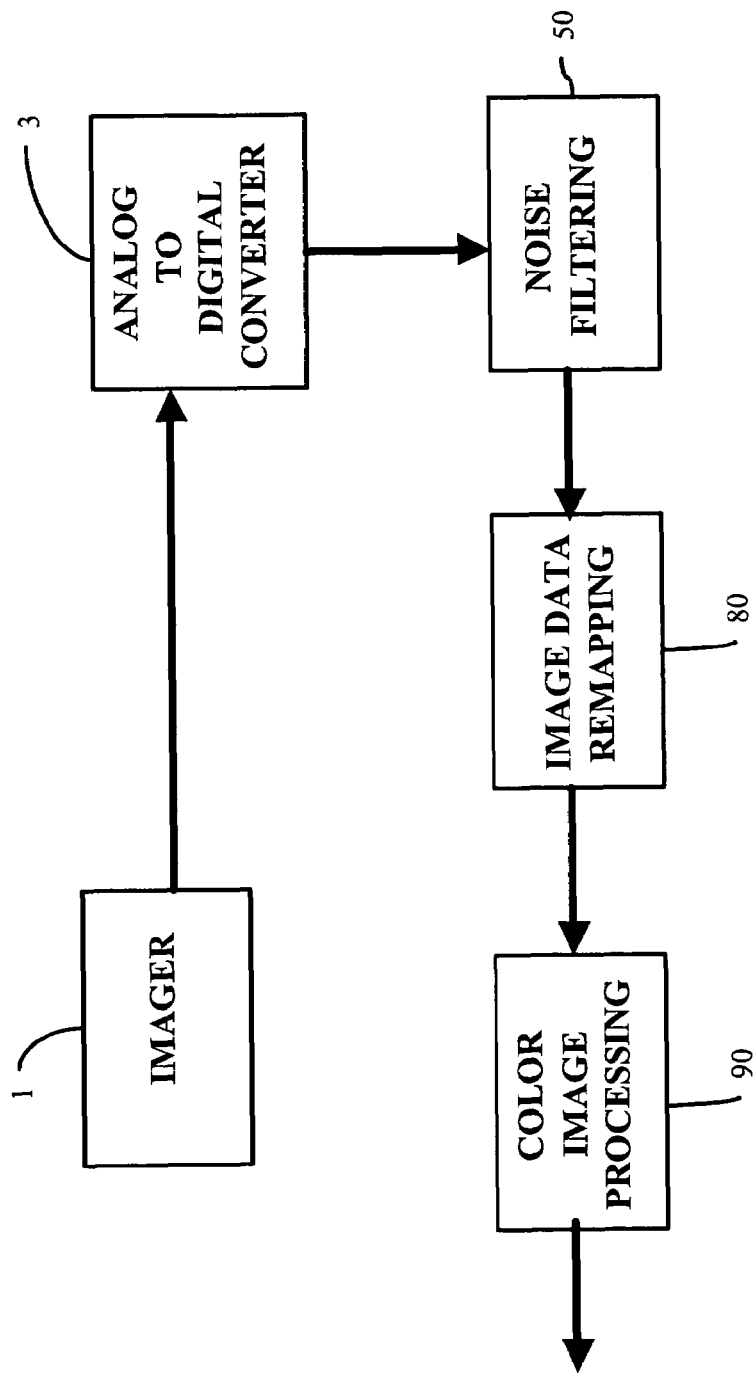
FIG. 2 is a block diagram showing an image processing pipeline for processing digital image data from an imager according to the concepts of the present invention.

FIG. 2 illustrates a block diagram showing an image-processing pipeline according to the concepts of the present invention. As illustrated in FIG. 2, an imager 1, comprising a plurality of photosensitive elements commonly referred to as pixels, images a scene and produces a plurality of voltages. In operation, the pixel is first reset with a reset voltage that places an electronic charge across the capacitance associated with; e.g., a photodiode. Electronic charge produced by the photodiode, when exposed to illumination, causes charge of the diode capacitance to dissipate in proportion to the incident illumination intensity of the scene. At the end of an exposure period, the change in diode capacitance charge is detected and the photodiode is reset. The amount of light detected by the photodiode is computed as the difference between the reset voltage and the voltage corresponding to the final diode capacitance charge.

The voltages generated by the imager 1 are fed to an analog to digital converter 3. The analog to digital converter 3 converts each analog voltage to a digital image data word having digital value in a range from 0, which represents no illumination, to some maximum value that represents illumination saturation. If the width of the digital image data word were set to 8-bits, the range of digital values that a digital image data word could realize would be in the range 0 to 255, 0 being no illumination and 255 being saturation.

The digital image data word is then filtered by a noise filtering subsystem 50. The noise filtering subsystem 50 modifies the digital image data to compensate for any imager characteristic artifacts, such as column noise, that were produced by the imager 1, for defective pixels in the imager 1, and for directional noise.

In a preferred embodiment of the present invention, the digital image data is initially filtered in the noise filtering subsystem 50 to remove column noise associated with the imager. The column noise filtering process of the present invention uses image data output by the imager during an analog to digital conversion test mode to remove imager-specific noise from the raw sensor data.

At the beginning of each imager idle cycle, an analog to digital conversion test is run. The imager idle cycle is initiated in response to certain events. Examples of such events in a still imager are powering up the imager, taking a picture, inserting/removing a card, and/or selecting options on the imager. Moreover, examples of such events in a video imager are powering up the imager and/or during blanking row periods (in between every frame of video data).

With respect to the utilization of the concepts of the present invention in conjunction with a still imager, for each column, all of the pixels in that column are assigned to an analog-to-digital converter associated with that column. During normal operations, each of the pixels of a particular column is switched "ON" in sequence so as to connect to the analog-to-digital converter associated with that column.

For example, during a 0.05 millisecond period of an image capture routine, a pixel of the column will be connected to the analog-to-digital converter associated with that column. During the next 0.05 millisecond period of an image capture routine, the next pixel in that column will be connected to the analog-to-digital converter associated with that column, and so on.

During the analog-to-digital converter test mode, all of the pixels are disconnected from the analog-to-digital converter. After disconnection, a constant voltage is applied to all of the analog-to-digital converters, and the outputs are used to calculate the relative analog-to-digital converter offsets. It is assumed that the analog-to-digital converters all have the same gain factor, but different offsets. The captured offsets define the column fixed pattern noise $\epsilon_{col,i}$.

To avoid clipping, the present invention, according to one embodiment thereof, initially adds the maximum column fixed pattern noise $\max(\epsilon_{col,i})$ to each pixel of digital image data and then subtracts the column fixed pattern noise $\epsilon_{col,i}$ associated with the column of the pixel wherein i is the column number of the pixel. This column noise filtering process produces digital image data wherein imager-specific noise, the relative analog-to-digital converter offsets, has substantially been removed.

In another embodiment of the present invention, to avoid clipping, the present invention initially adds the average column fixed pattern noise $\text{ave}(\epsilon_{col,i})$ to each pixel of digital image data and then subtracts the column fixed pattern noise $\epsilon_{col,i}$ associated with the column of the pixel wherein i is the column number of the pixel. This column noise filtering process produces digital image data wherein imager-specific noise, the relative analog-to-digital converter offsets, has substantially been removed.

On the other hand, with respect to the utilization of the concepts of the present invention in conjunction with a video imager, for each column, all of the pixels in that column are assigned to an analog-to-digital converter associated with that column. During normal operations, each of the pixels of a particular column is switched "ON" in sequence so as to connect to the analog-to-digital converter associated with that column.

In the video embodiment, the present invention, according to one embodiment thereof, disconnects all the pixels from the analog-to-digital converter during the analog-to-digital converter test mode, the analog-to-digital converter test mode typically occurring during the blanking row periods between the every capture of a frame of image data. After disconnection, a constant voltage is applied to all of the analog-to-digital converters, and the outputs are used to calculate the relative analog-to-digital converter offsets. The present invention uses the outputs by the imager in the analog-to-digital converter test mode to remove imager-specific noise from the raw sensor data.

In another embodiment, the present invention disconnects all the pixels from the analog-to-digital converter during the analog-to-digital converter test mode, the analog-to-digital converter test mode occurring during the blanking row periods between the every capture of a frame of image data. After disconnection, two fixed voltages (a low voltage and a high voltage) are separately applied to all of the analog-to-digital converters, and the outputs are used to calculate the analog-to-digital converters' relative gains and relative offsets.

It is noted that column noise, in the video embodiment, should be very constant for a particular image, so the present invention imposes a smoothing filter on the relative analog-to-digital converter offsets to remove random noise over time. As the relative analog-to-digital converter offset data for each frame is captured, the relative analog-to-digital converter offset data is compared with the stored relative analog-to-digital converter offset data (initially zero). If the new relative analog-to-digital converter offset data is larger than the stored value for a given column, the stored value is incremented by 0.5 prior to the start of the next frame. Conversely, if the new value is less than the stored value, the stored value is decremented by 0.5 before the next frame. The stored offset value for a particular column defines the column fixed pattern noise $\epsilon_{col,i}$ for that column.

As in the still embodiment, to avoid clipping in the video embodiment, the present invention, according to one embodiment thereof, initially adds the maximum column fixed pattern noise $\max(\epsilon_{col,i})$ to each pixel of digital image data and then subtracts the column fixed pattern noise $\epsilon_{col,i}$ associated with the column of the pixel wherein i is the column number of the pixel. This column noise filtering process produces digital image data wherein imager-specific noise, the relative analog-to-digital converter offsets and/or gains, has substantially been removed.

In another video embodiment of the present invention, to avoid clipping, the present invention initially adds the average column fixed pattern noise $\mathrm{ave}(\epsilon_{col,i})$ to each pixel of digital image data and then subtracts the column fixed pattern noise $\epsilon_{col,i}$ associated with the column of the pixel wherein i is the column number of the pixel. This column noise filtering process produces digital image data wherein imager-specific noise, the relative analog-to-digital converter offsets and/or gains, has substantially been removed.

In a further embodiment, the present invention determines if the imager is in a still image mode or a video mode. If the imager is in a still image mode, the present invention adds the maximum column fixed pattern noise $\max(\epsilon_{col,i})$ to each pixel of digital image data and then subtracts the column fixed pattern noise $\epsilon_{col,i}$ associated with the column of the pixel wherein i is the column number of the pixel to avoid clipping. On the other hand, if the image is in a video mode, the present invention adds the average column fixed pattern noise $\mathrm{ave}(\epsilon_{col,i})$ to each pixel of digital image data and then subtracts the column fixed pattern noise $\epsilon_{col,i}$ associated with the column of the pixel wherein i is the column number of the pixel to avoid clipping.

It is further noted that for each embodiment described above, dark rows of pixels or shielded fixed voltage rows can also be utilized as the source of column noise data to be used to calculate the relative analog-to-digital converter offsets and/or gains. More specifically, column noise data from dark rows are preferable for removing artifacts known as the "virtual row band," "Tint band" or "ADC test mode band."

After the column noise filtering process, the filtered digital image data may be processed by the noise filtering subsystem 50 so as to eliminate the effect of single pixel defects in the imager. Due to manufacture defects and eventual pixel failure, an imager may have numerous defective pixels that may be stuck at arbitrary voltages, may float, and may be either linear or logarithmic in response depending on the location of the flaw or defect. These defective pixels can cause the linear scaling process to waste valuable bits just to represent a few excessively bright pixels that do not contain valid image data.

Thus, the present invention uses 3×5 smoothing filter on a color filter array comprising a mixture of primary, complementary and unfiltered pixels; e.g., ((R,G),(G,B)) or ((M,Y),(W,C)). In the preferred embodiment of the present invention, Bayer data comes from the column noise filter. The 3×5 smoothing filter of the present invention clamps pixels of image data which are greater than the maximum value of the image data of neighboring pixels or less than the minimum value of the image data of neighboring pixels.

Figure 3:
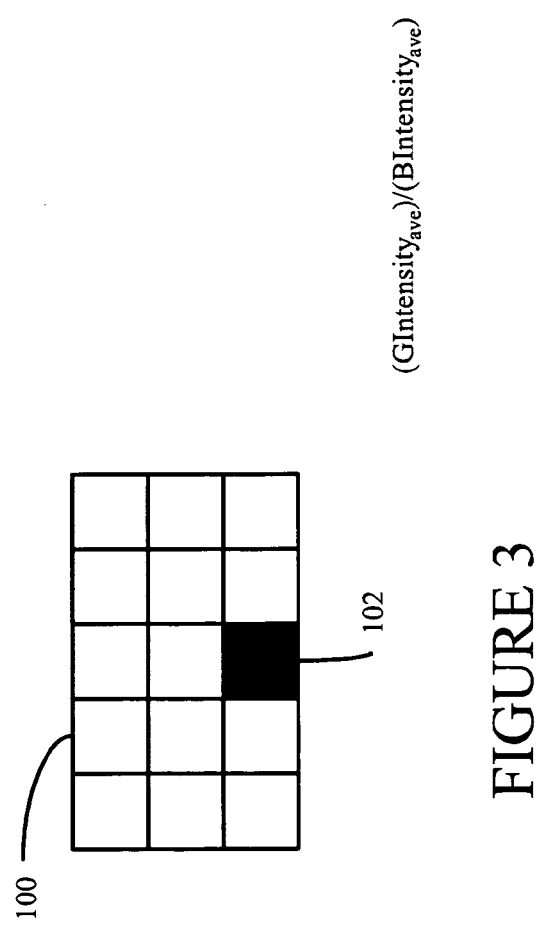
FIG. 3 illustrates a 3×5 smoothing filter window for substantially eliminating the effects of defective pixels within the imager, according to the concepts of the present invention.

FIG. 3 illustrates the window 100 for the 3×5 filter. As illustrated in FIG. 3, the window 100 contains the current pixel or pixel in question 102 and its surrounding neighboring pixels. The location of the current pixel 102 within the window 100 is selected to alleviate the problem with red or blue image data when using a primary color array filter. In this situation, if the current pixel 102 was selected to be located in the center of the 3×5 window 100, the red or blue image data would have a smaller sample and thus the filtering would be less effective on clamping pixels of red or blue image data which are greater than the maximum value of the image data of neighboring pixels or less than the minimum value of the image data of neighboring pixels. In other words, if a centered pixel was chosen, the result would be only two neighbors of a same color available for filtering; whereas by having the current pixel 102 off-centered, as illustrated in FIG. 3, the result is that five neighbors of a same color being available for filtering.

In another embodiment, the present invention uses a 5×5 smoothing filter on a color filter array comprising a mixture of primary, complementary, and unfiltered pixels. This 5×5 smoothing filter only utilizes the pixels, within the 5×5 window, having the same color as the pixels being filtered. The 5×5 smoothing filter, according to this embodiment of the present invention, clamps pixels of image data which are greater than the maximum value of the image data of neighboring pixels having a same color or less than the minimum value of the image data of neighboring pixels having a same color.

In a further embodiment, the present invention captures image data from a 9×9 array of pixels on the imager if the pixel being filtered is red or blue. From that captured 9×9 array of image data, the present invention generates a 5×5 array of image data wherein all the image data is of the same color as the pixel being filtered. Thereafter, the present invention utilizes the 5×5 smoothing filter to clamp the pixels of image data which are greater than the maximum value of the image data of neighboring pixels in the generated 5×5 array of image data or less than the minimum value of the image data of neighboring pixels in the generated 5×5 array of image data. On the other hand, if the pixel being filtered is green, the present invention captures image data from a 5×5 array of pixels on the imager. From the captured 5×5 array of image data, the present invention utilizes the 5×5 smoothing filter to clamp the pixels of image data which are greater than the maximum value of the image data of the green pixels in the generated 5×5 array of image data or less than the minimum value of the image data of the green pixels in the generated 5×5 array of image data.

It is noted that if ripples are realized in the image, the ripples can be substantially reduced by eliminating the effect of single pixel defects before crosstalk filtering.

The noise filtering subsystem 50 may further filter the digital image noise for directional noise. In this filtering process, the present invention looks for an edge in the imaged scene using conventional edge detection routines. Upon finding an edge, the present invention filters along the edge, not across the edge, to remove any noise at the edge.

To realize this directional filtering of the present invention, for each pixel, the present invention considers 4 directions: horizontal, vertical, and the two diagonals. In each direction, the present invention calculates two numbers: an output of filtering along that direction, and the likelihood that the direction crosses an edge.

An example of output would be ¼p(−2,0)+½p(0,0)+¼p(2,0), where p(x,y) is the pixel value at the x,y coordinates. In this example, the present invention uses a weighted sum of pixels that are 2 elements apart because the Bayer filter pattern dictates that pixels of the same color are 2 elements apart.

An example of likelihood would be |p(−2,0)−p(0,0)|+|p(0,0)−p(2,0)|. In this case, the vertical bars indicate absolute value. So the purpose of calculation is to find the magnitude of the differences between adjacent pixels. A large difference indicates a strong likelihood that the filter crosses an edge.

Once the outputs and likelihoods have been calculated for all four directions with respect to a given pixel, the next step is to choose which directions should be kept. A threshold is determined based on the four likelihoods such that at least one of the directions passes the threshold. Then each of the four likelihoods is compared to the threshold, and ones that pass result in those outputs being averaged into the final output.

The overall process results in an adaptive filter that changes when an edge is crossed. In regions with no edges, all four directions are averaged to produce a symmetrical filter. In regions with a strong edge, only one direction will be kept, resulting in a filter that operates only along the direction of the edge.

By utilizing the above-described filtering techniques along the edge, the present invention is able to filter the noise in this region without blurring the edge.

After the noise filtering subsystem 50 has completed these various filtering routines, the filtered digital image data is received by the image data remapping subsystem 80. Generally, in the image data remapping subsystem 80, the filtered digital image data is decompressed, white balanced to compensate for the various possible lighting conditions encountered during the imaging of the scene, and remapped linearly before the data is recompressed.

Figure 5:
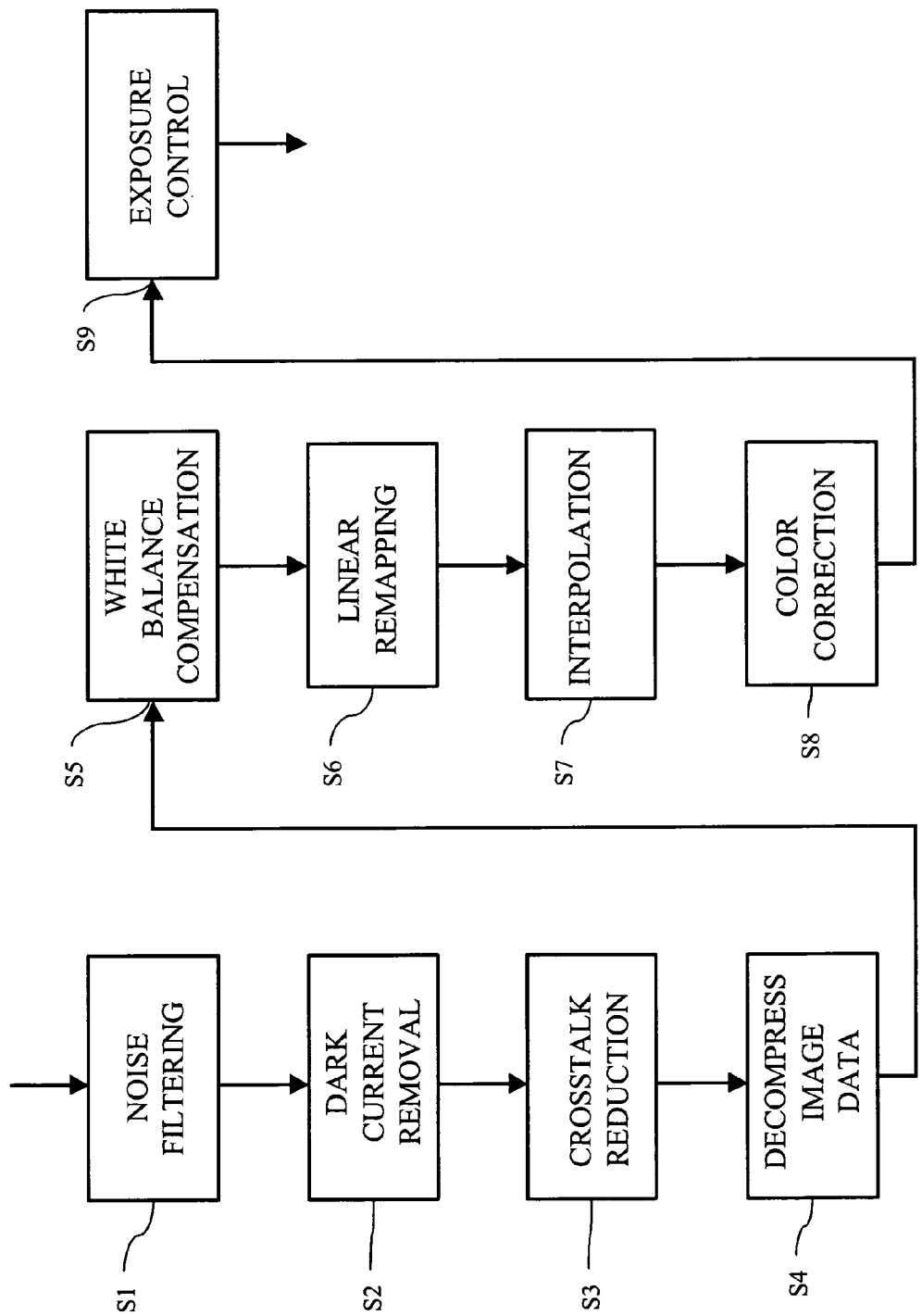
FIG. 5 is a flowchart showing one embodiment of the image processing pipeline for processing digital image data from an imager according to the concepts of the present invention.
Figure 6:
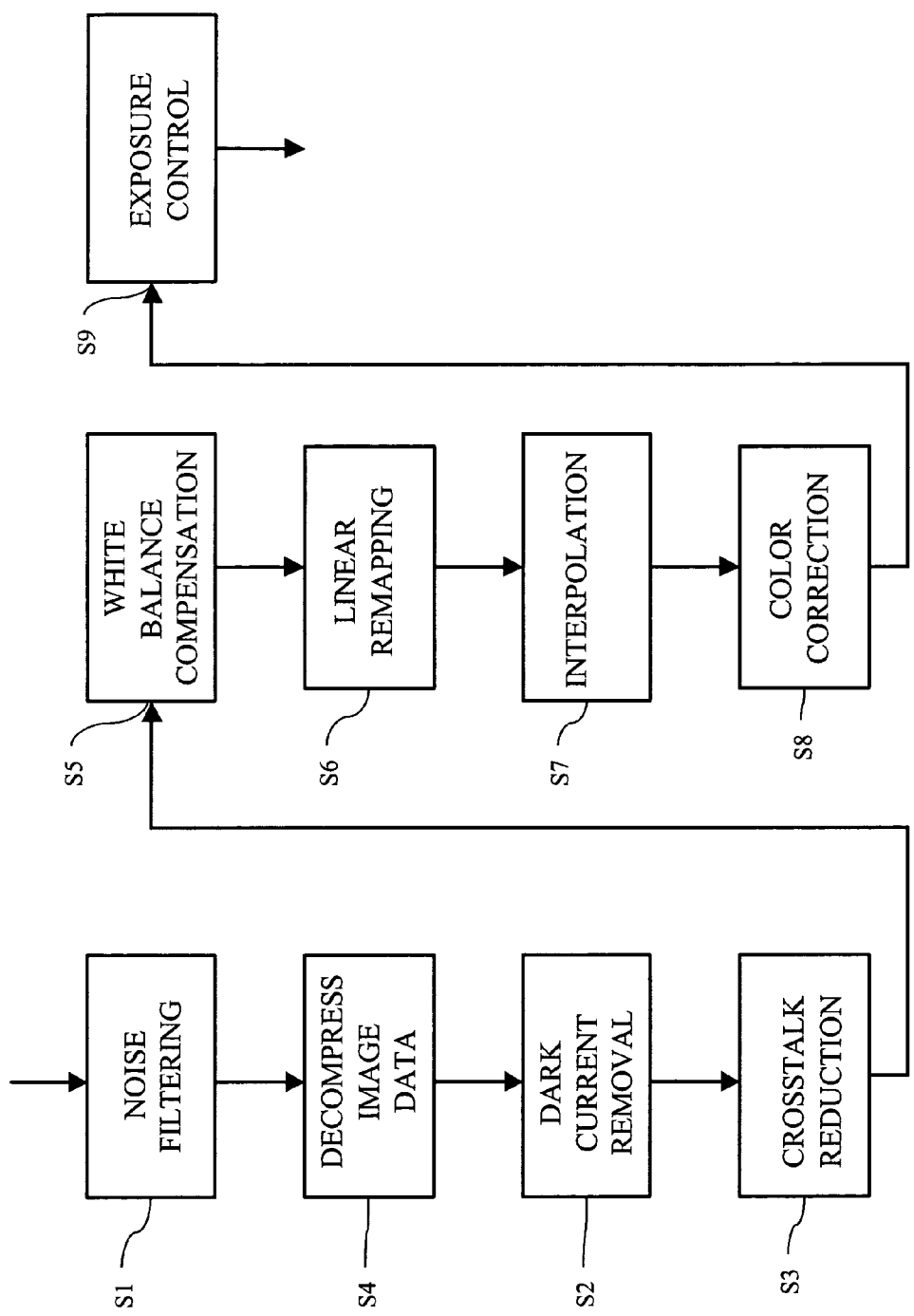
FIG. 6 is a flowchart showing another embodiment of the image processing pipeline for processing digital image data from an imager according to the concepts of the present invention.

It is noted that the image data remapping subsystem 80 may include additional filtering processes as illustrated in FIG. 6 wherein dark current removal and crosstalk reduction processes are performed upon the decompressed digital image data or the dark current removal and crosstalk reduction processes can be performed upon the compressed digital image data prior to decompression as illustrated in FIG. 5.

The decompression process of the present invention uses a transfer function to convert 12-bit logarithmic intensity sensor values into 20-bit linear values. The transfer function used is dependent upon the compression level set by the imager controller during the previous frame time. In the preferred embodiment of the present invention, the imager used is the Autobrite™ Imager available from SMaL Camera Technologies, Inc., of Cambridge, Mass.

To describe the setting of the compression levels contemplated by the preferred embodiment of the present invention, various terms will be used. In this description, a frame period is the time period needed to read all the pixels of a digital imager to produce one frame of an imaged scene. Integration time refers to the time period, within an overall frame period, that a digital imager is receiving incident light or illumination from a scene being imaged and producing a collectable charge or voltage in response to incident light or illumination of the scene being imaged. Illumination intensity level mapping function refers to the analog to digital conversion relationship between an analog signal received from a pixel of the digital imager and a digital signal representing the illumination intensity received by the pixel. Output voltage versus illumination intensity level map is a graphical representation of the illumination intensity level mapping function. Transfer control function refers to the controlling of the charge dissipation from the pixel of the digital imager during the integration time period through timing manipulation and control signal voltage level or value manipulation. Transfer control function generation refers to either the actual generation of the control signal that controls the charge dissipation from the pixel of the digital imager or a signal that is used to generate the control signal that controls the charge dissipation from the pixel of the digital imager.

Figure 7:
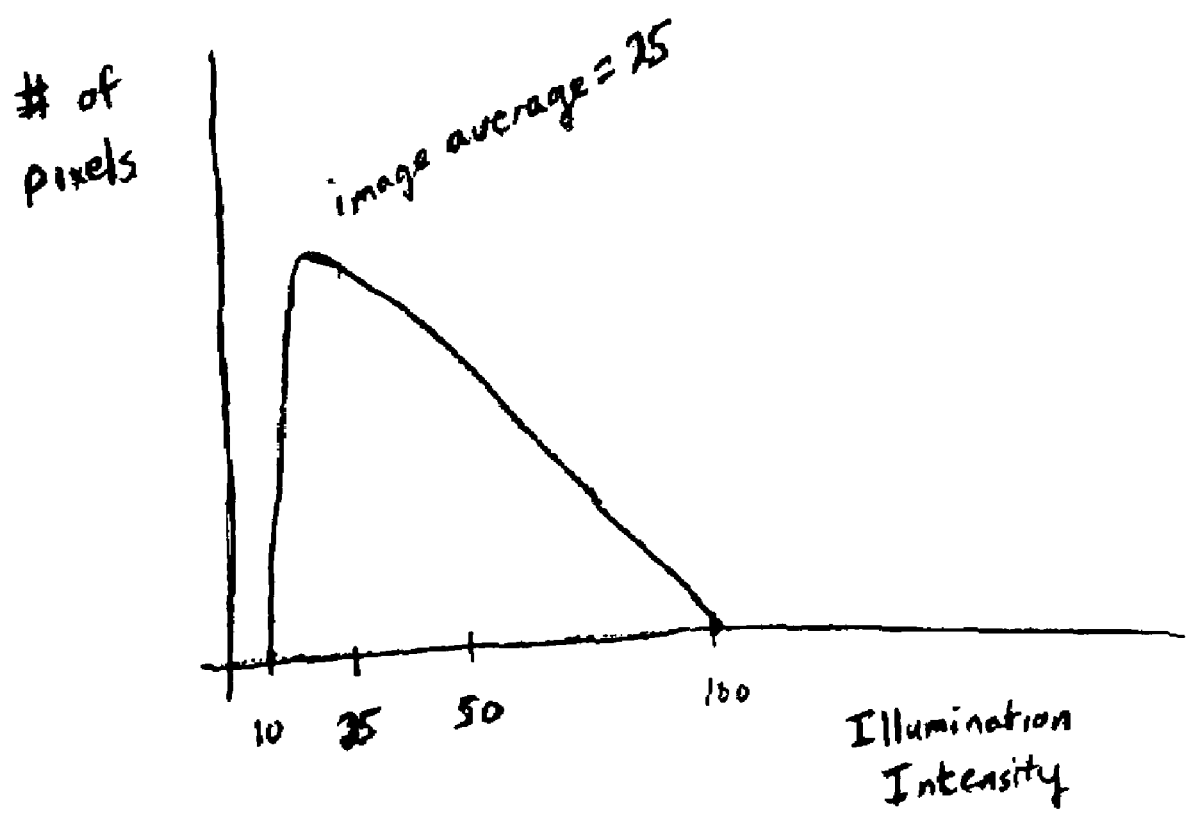
FIG. 7 is a histogram of illumination intensity levels of an imaged scene.

The imager adjusts the integration time and manipulates the transfer control function (resulting in the production of the control signal) to realize a histogram of the imaged scene, as illustrated in FIG. 7. In FIG. 7, using a pixel-by-pixel sensitivity adjustment, the entire histogram is made to fit within the range of the sensor such that no saturation results while keeping the image average at 50 to ensure the image is bright enough to be visually appealing and thus not reducing the signal to noise ratio in the pixels of lower illumination intensities where the human eye is more sensitive to noise. In this way, the low illumination intensity levels of the scene are emphasized, and the high illumination intensity levels of the scene are discernable, with no pixels becoming saturated during a given frame period, F.

The imager varies the sensitivity of each pixel of a digital imager so that if a scene has a wide dynamic range, the digital imager can produce a non-linear mapping of the output voltages from the digital imager to digital illumination intensity levels or values representing the imaged scene. The output voltages representing the higher illumination intensity levels of the scene, where the eye is less sensitive to quantization noise, are non-linearly mapped to illumination intensity levels such that the resolution of the higher illumination intensity levels are compressed. Moreover, the output voltages representing the low illumination intensity levels of the scene are amplified to ensure the image is bright enough. The results are imaged scenes with appropriate brightness and no saturation.

The imager dynamically adjusts the mapping of the output voltages to imaged scene illumination intensity levels, thereby continually compressing or decompressing the resolution of the high illumination intensity levels of the scene, so as to change or unequally distribute the amount of quantization noise for different levels of light (illumination) intensity. Under a completely linear mapping, all possible illumination intensities of the imaged scene would have the same resolution or amount of quantization noise.

The imager selectively decreases or compresses the resolution of higher illumination intensity levels, by non-linearly adjusting the mapping of the output voltage versus illumination intensity level of the imaged scene map, to increase the saturation point. The result is that given a scene with a wide dynamic range, the output voltages associated with the low illumination intensity level pixels can be amplified enough to have the desired resolution and the output voltages associated with the high illumination intensity level pixels can be mapped to compress the resolution of the high illumination intensity levels to fit within the range of the analog to digital converter associated with the digital imager and avoid saturation. To realize this, a desirable illumination intensity level mapping is automatically determined and the determined illumination intensity level mapping is converted into a transfer control function (resulting in the production of the control signal) for the digital imager. The transfer control function (resulting in the production of the control signal) controls the production or accumulation of charge in the photosensitive element, thus controlling the output voltage of the pixel.

Figure 8:
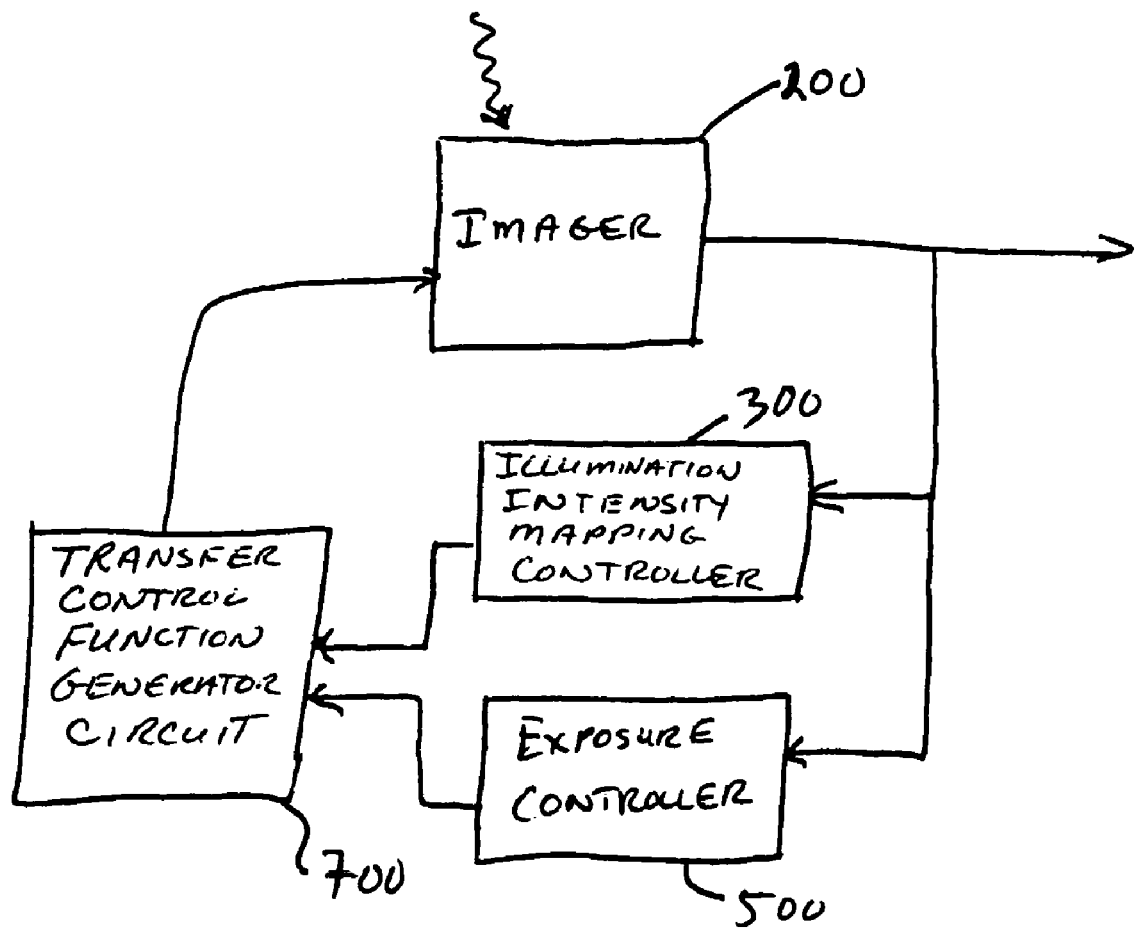
FIG. 8 is a block diagram of the adaptive sensitivity, on a pixel-by-pixel basis, control system.

FIG. 8 illustrates one embodiment of an imager controller that emphasizes the low illumination intensity levels of the scene, and discerns the high illumination intensity levels of the scene, with no pixels becoming saturated during a given frame period, F. As shown in FIG. 8, a system for adaptively controlling sensitivity, on a pixel-by-pixel basis, of a digital imager includes a digital imager 200, an illumination intensity level mapping controller 300, an exposure controller 500, and a transfer control function generation circuit 700.

The illumination intensity level mapping controller 300 determines a number of pixels of imaged scene having illumination intensity levels within a first defined range of illumination intensity levels. The illumination intensity level mapping controller 300 also determines an illumination intensity level mapping function based upon the determined number of pixels within the first defined range of illumination intensity levels.

The exposure controller 500 determines a number of pixels of the imaged scene having illumination intensity levels within a second defined range of illumination intensity levels and determines an integration time, $T_{int}$, based upon the determined number of pixels having illumination intensity levels within a second defined range of illumination intensity levels.

The transfer control function generation circuit 700 determines a transfer control function based on the determined illumination intensity level mapping function and integration time, $T_{int}$. The transfer control function generation circuit 700 further imposes the determined transfer control function upon a pixel of the digital imager.

The digital imager 200 receives the transfer control function, and produces a control signal therein in accordance with the received transfer control function. The first defined range of illumination intensity levels is a range of illumination intensity levels including an illumination intensity level representing pixel saturation, and the second defined range of illumination intensity levels is a range of illumination intensity levels including an illumination intensity level representing a minimum illumination intensity level that may be adjusted for pixel noise or pixel offset.

The illumination intensity level mapping controller 300 determines a number of pixels of image data having illumination intensity levels within a first defined range of illumination intensity levels from a frame of pixels of image data created by the digital imager, from a partial frame of pixels of image data created by the digital imager, from a defined area within a frame of pixels of image data created by the digital imager, or from a user-defined area within a frame of pixels of image data created by the digital imager.

The illumination intensity level mapping function can be either calculated or selected from a plurality of pre-specified illumination intensity level mapping functions, preferably from eight pre-specified illumination intensity level mapping functions, based upon the determined number of pixels within the first defined range of illumination intensity levels. Moreover, the transfer control function can be either calculated or selected from a plurality of pre-specified transfer control functions based upon the determined illumination intensity level mapping function and determined integration time, $T_{int}$.

Furthermore, the determination of the transfer control function can realized during the generation of a second frame of image data that is immediate subsequent to the frame of image data being used to make the determination. In this situation, the new transfer control function is imposed upon pixels during the generation of a third frame of image data, the third frame being immediate subsequent to the second frame of image data.

On the other hand, if the determination is being made on only a partial frame, the determination of the transfer control function can realized during the generation of a first frame of image data which is the frame of image data having the partial frame of image. In this situation, the new transfer control function is imposed upon pixels during the generation of a second frame of image data, the second frame being immediate subsequent to the first frame of image data.

The illumination intensity level mapping function may be determined independent of, dependent upon, after, before, or substantially simultaneous with the determination of the integration time, $T_{int}$. Moreover, the illumination intensity level mapping function may be a composite function comprising individual discrete functions wherein each individual discrete illumination intensity level mapping function is determined based upon the determination of a number of pixels within a defined range of illumination intensity levels. Each individual illumination intensity level mapping function is associated with a defined range of illumination intensity levels.

The illumination intensity level mapping controller 300 determines a plurality of number of pixels, each determined number of pixels corresponding to one defined range of illumination intensity levels. Each illumination intensity level mapping function is determined based upon the determined number of pixels within the associated defined range of illumination intensity levels.

The transfer control function generation circuit 700 determines a transfer control function based on the plurality of determined illumination intensity level mapping functions and imposes the determined transfer control function upon a pixel of the digital imager.

One way of manipulating the transfer control function is to use a stepped or piecewise discrete-time transfer control function. By using a stepped or piecewise discrete transfer control function, the map of the pixel output voltage versus illumination intensity can be modified to enable a wider range of possible illumination intensity levels before saturation, while emphasizing low illumination intensity levels.

However, to use a stepped or piecewise discrete-time transfer control function, each stepped transfer control function or control signal level must be determined as well as the timing of the transition points between discrete transfer control functions or discrete control signal levels. The transfer control function is a stepped or piecewise discrete-time transfer control function, thereby producing a control signal that is a stepped or piecewise discrete-time control signal.

When the transfer control function generation circuit 700 receives $T_{int}$, the first transition point from a first discrete transfer control function to a discrete second transfer control function of the composite transfer control function is immediately set. The illumination intensity level mapping function, g, determines the actual discrete transfer control functions, wherein the actual discrete transfer control functions determine each of the actual discrete control signal levels.

Figure 10:
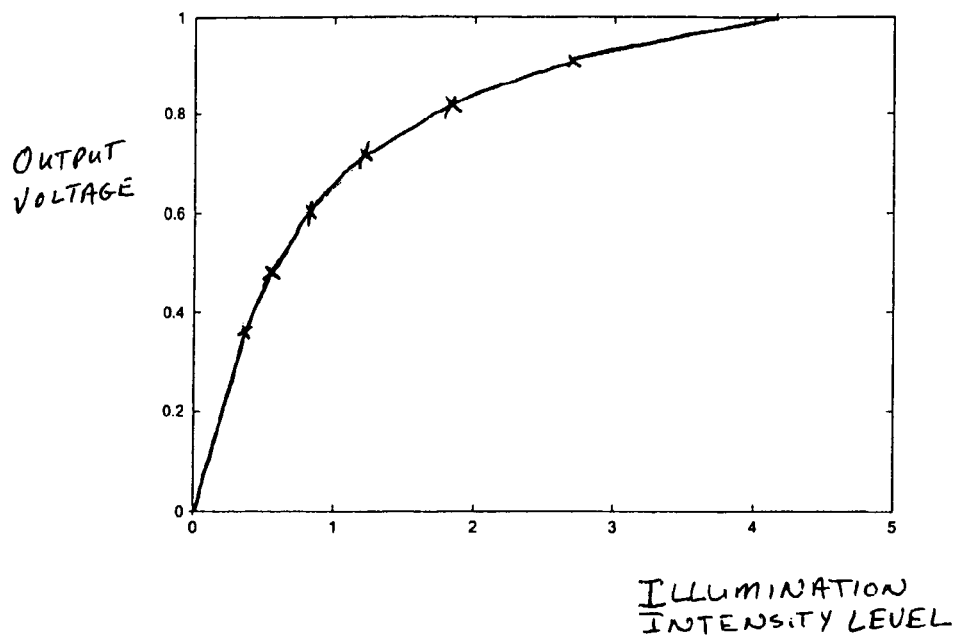
FIG. 10 shows a desired map of output voltage versus illumination intensity level for a scene imaged to produce the transfer control function of FIG. 9.

In the example discussed below, the illumination intensity level mapping function, g, is derived from the desired map of output voltage versus illumination intensity level of the imaged scene illustrated in FIG. 10. As seen in FIG. 10, the desired map of output voltage versus illumination intensity level of the imaged scene is a piece-wise discrete mapping, with each discrete mapping corresponding to a different compression of the resolution of the associated illumination intensity level range. As noted below, each discrete compression of the resolution of the associated illumination intensity level range corresponds to a level, $b_i$, in the transfer control function. As the compression of the resolution of the associated illumination intensity level range is increased, the corresponding level, $b_i$, is decreased.

As noted above, the transfer control function is a discrete piece-wise linear function, having eight pieces or steps formed by seven transition points, that produces a nearly logarithmic response.

Figure 9:
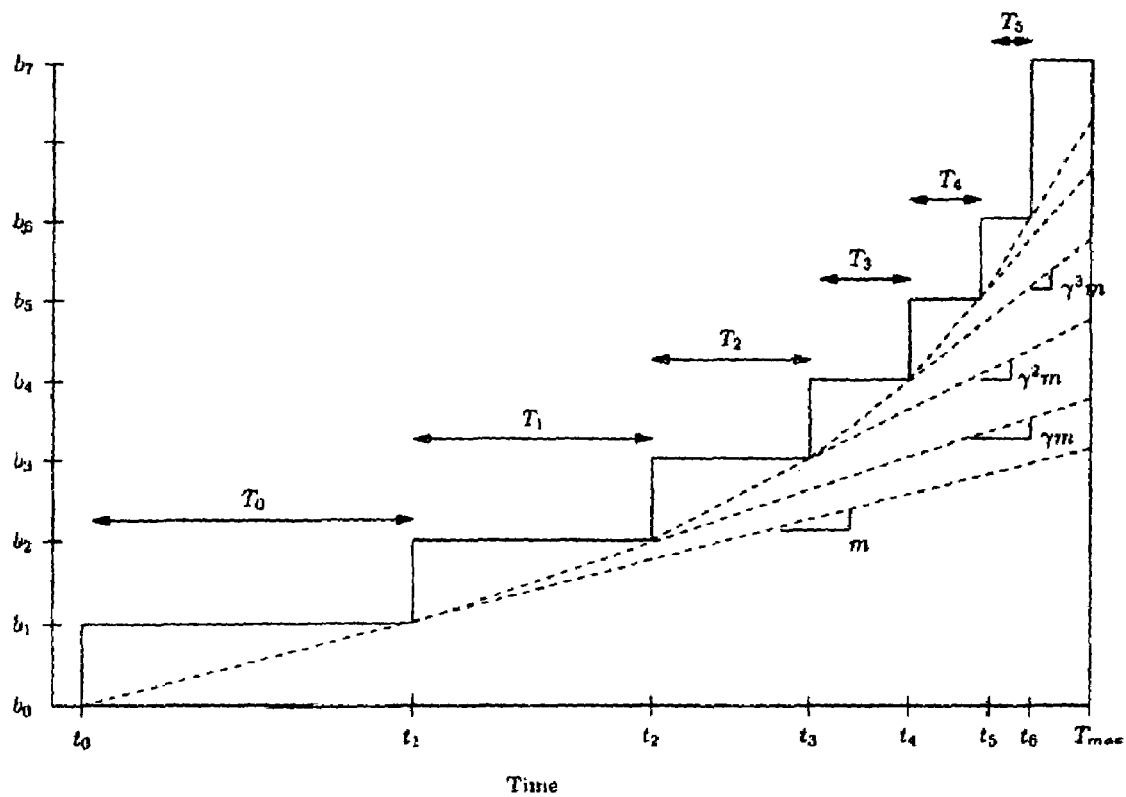
FIG. 9 shows calculating the timing of the transition points for a transfer control function.

An example of a stepped or piecewise discrete-time transfer control function is illustrated in FIG. 9. In FIG. 9, the timing of the transition points, t, is set forth on the horizontal axis, and a level, b, corresponding to the transfer control function, which corresponds to an amount of the subsequently produced control signal being stepped down from a reset level, is set forth on the vertical axis.

The stepped or piecewise discrete-time transfer control function, as illustrated in FIG. 9, is realized by:

1. Setting the slope of region from the first transition point, $t_1$, to the second transition point, $t_2$, to be m;
2. Setting the slope of the region from the second transition point, $t_2$, to the third transition point, $t_3$, to be gm;
3. Setting the slope of the region from the third transition point, $t_3$, to the fourth transition point, $t_4$, to be $g^2m$;
4. Setting the slope of the region from the fourth transition point, $t_4$, to the fifth transition point, $t_5$, to be $g^3m$;
5. Setting the slope of the region from the fifth transition point, $t_5$, to the sixth transition point, $t_6$, to be $g^4m$; and
6. Setting the slope of the region from the sixth transition point, $t_6$, to the seventh transition point, $t_7$ or $T_{max}$, to be $g^5m$.

If more than seven transition points are desired, the slope of the region between subsequent transition points would continue to increase by a factor g.

With such an approach, when the exposure controller 500 specifies the desired integration time, $T_{int}$, and the illumination intensity level mapping controller 300 specifies the desired illumination intensity level mapping function, g, the stepped transfer control function is completely constrained; however, it is still necessary to determine when the transition points between the discrete transfer control functions occur during the overall frame period, $T_{max}$.

As illustrated in FIG. 9, there are seven transition points. These seven transition points can be determined by solving the resulting sets of simultaneous equations:

$$t_0 = T_{max} - T_{int}$$

$$m = (b_1 - b_0)/T_0$$

$$mg = (b_2 - b_1)/T_1$$

$$mg^2 = (b_3 - b_2)/T_2$$

$$mg^3 = (b_4 - b_3)/T_3$$

$$mg^4 = (b_5 - b_4)/T_4$$

$$mg^5 = (b_6 - b_5)/T_5$$

$$mg^6 = (b_7 - b_6)/T_6$$

$$T_{max} = t_0 + T_0 + T_1 + T_2 + T_3 + T_4 + T_5 + T_6$$

The above equations use the variables all referenced in FIG. 9. It is assumed that the levels, $b_0$ through $b_7$, corresponding to the transfer control function, which individually correspond to an amount of the subsequently produced control signal being stepped down from a reset level, are equally spaced by a quantity $\Delta b$ (except that $(b_7 - b_6 = 2\Delta b)$, the above equations, solving for $T_0$, $T_1$, $T_2$, $T_3$, $T_4$, and $T_5$ yield $$T_0 = (g^6)/(g^6 + g^5 + g^4 + g^3 + g^2 + g + 2) * T_{int}$$

$$T_1 = (T_0)/g$$

$$T_2 = (T_1)/g$$

$$T_3 = (T_2)/g$$

$$T_4 = (T_3)/g$$

$$T_5 = (T_4)/g$$

With the solving for $T_0$, $T_1$, $T_2$, $T_3$, $T_4$, and $T_5$, the seven transition points; $t_0$, $t_1$, $t_2$, $t_3$, $t_4$, $t_5$, and $t_6$; are:

$$t_0 = T_{max} - T_{int}$$

$$t_1 = t_0 + T_0$$

$$t_2 = t_1 + T_1$$

$$t_3 = t_2 + T_2$$

$$t_4 = t_3 + T_3$$

$$t_5 = t_4 + T_4$$

$$t_6 = t_5 + T_5$$

It is noted that the levels, $b_i$, need not be evenly spaced to find the transition points. The equal spacing of b is just an example of creating a transfer control function.

The transition points between the plurality of discrete transfer control functions, which form a composite transfer control function, are determined following the determination of an integration time, $T_{int}$, and an illumination intensity level mapping function, the illumination intensity level mapping function providing the proper compression of the resolution of the high illumination intensity levels of imaged scene and proper emphasis of the low illumination intensity levels of imaged scene.

The composite transfer control function has eight discrete transfer control functions and seven transition points. The first transition point is equal to a difference between a maximum possible integration time, $T_{max}$, or frame period, F, and the determined integration time, $T_{int}$. Subsequent transition points, assuming that the levels, $b_i$, are equally spaced by a quantity $\Delta b$ (except that ($b_7-b_6=2\Delta b$), are equal to a sum of all previous transition points and a time $T_s=((g^{n-1})/((g^{n-1}+g^{n-2}+ \ldots +g^2+g+2)(g^{(p)})))*T_{int}$, where g is equal to the determined illumination intensity level mapping function, n is equal to a total number of transition points, p is equal to a positional number of the discrete transfer control function being calculated, and $T_{int}$ is equal to the determined integration time. If the levels, $b_i$, are not equally spaced by a quantity $\Delta b$, the equation would be slightly different depending upon the spatial relationship between levels, $b_i$.

Figure 11:
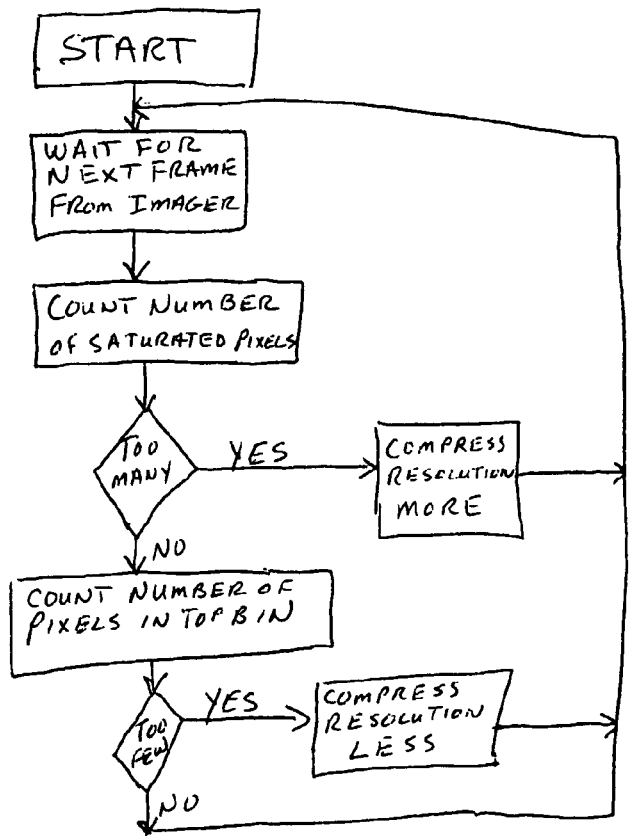
FIG. 11 illustrates a flowchart showing the operations of an illumination intensity mapping controller.

FIG. 11 illustrates a process utilized by the illumination intensity mapping controller 300. As illustrated in FIG. 11, the illumination intensity mapping controller 300 takes the imaged scene from the sensor and counts the number of saturated pixels. If there are too many saturated pixels, the illumination intensity mapping controller 300 increases the amount of compression upon the resolution of the high illumination intensity levels. The illumination intensity mapping controller 300 also counts the number of pixels in the upper region (bin) of a histogram of the imaged scene to determine if the imaged scene fills the entire range of the histogram. If there are not enough pixels in the upper region (bin), the illumination intensity mapping controller 300 decreases the amount of compression upon the resolution of the high illumination intensity levels. The illumination intensity mapping controller 300 continues this process until there are no saturated pixels and the histogram is completely used.

This approach works well for video applications in that the illumination intensity mapping controller 300 can continuously run without having to drastically change the illumination intensity mapping function to determine how to best set it. If the number of illumination intensity mapping steps is minimized under the constraint of stability, eight illumination intensity mapping steps are sufficient. This allows the illumination intensity mapping function to be set within 16 frames as a maximum.

Figure 12:
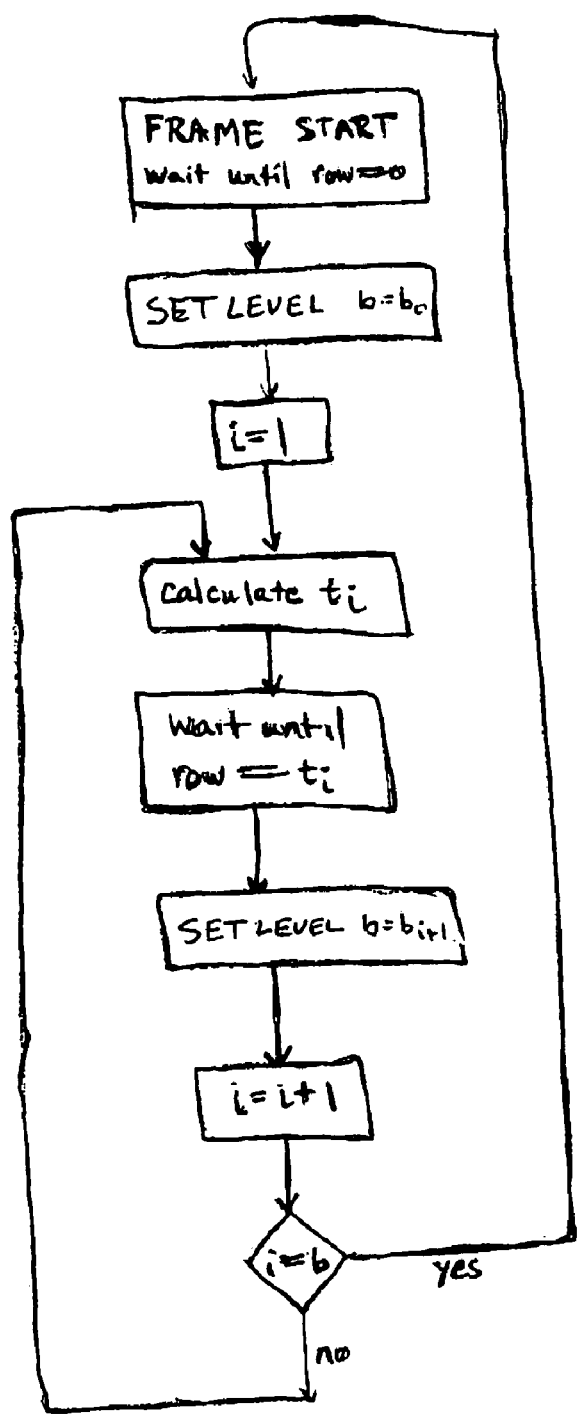
FIG. 12 illustrates a flowchart showing the operations of a transfer control function generator circuit.

FIG. 12 illustrates a process utilized by a transfer control function generator circuit 700. As illustrated in FIG. 14, the transfer control function generator circuit 700 sets the initial level, b, of the transfer control function to $b_0$. A step value, i, is set to a value of 1. The timing of the transition point, $t_i$, is calculated. The transfer control function generator circuit 700 goes into a standby state, sending the last establish level, b, to the digital imager, until the calculated transition point, $t_i$, is realized. When the calculated transition point, $t_i$, is realized, a new level, b, is set equal to $b_{i+1}$. The step value, i, is incremented by 1. The calculating of the transition point, $t_i$, and setting of the level, b, is repeated until the step value, i, is equal to 6.

Back to the decompression process, the present invention may use an eleven-piece binary slope approximation for each of the possible decompression curves. In the present invention, each decompression curve is assigned a gamma code for identification purposes.

The eleven-piece binary slope approximation of the present invention uses line segments starting at slope 1 an increasing the slope 1024, with varying breakpoints and y-intercepts, to approximate the appropriate power function. To decompress a pixel, the present invention compares its intensity value x with each of the 10 breakpoints in succession until the intensity value x is less than the next barrier value or until the present invention reaches the 11th and final line segment. Thereafter, the linear function $y=m_ix+b_i$ is computed where i is the selected line segment. The resulting value is the decompressed pixel value.

The present invention may also use a 32-segment or higher, preferably a 256-segment, linear approximation to the inverse of the empirically measured compression curves to decompress the pixel image data. In this embodiment, the decompress value x' of the pixel for an input value x is determined by linear interpolation. It is noted that any number of segments can be used in the linear approximation, but preferably the number of segments is a power of 2.

Initially, the present invention shifts the value x right by seven bits to find which line segment i it is in. The present invention then looks up the samples delimiting the segment i denoted by $s_i$ and $s_{i+1}$. It is noted that so equals zero. The difference $s_{i+1}-s_i$ is the vertical rise of the linear segment. The run is always 128 given a stream of 12-bit compressed data samples. Therefore, in this embodiment of present invention, the decompress value x' is given in by the following equation:

$$x'=((((x-128i)(s_{i+1}-s_i))+64)/128)+s_i.$$

It is important to note that the addition of 64 causes this process to be a rounded division rather than a truncation.

The image data remapping subsystem 80 may also include a dark current removal process. As noted before, as illustrated in FIG. 6, the dark current removal process may be performed upon the decompressed digital image data or upon the compressed digital image data prior to decompression as illustrated in FIG. 5.

Dark current is a DC bias that depends on temperature and the exposure time used to capture a frame. In the preferred embodiment, it is read from a pair of shielded "dark" columns to the right of the image array, which is conveyed along with the active data of each frame. Temperature and exposure time vary slowly, so it is possible to use values from one or more previous frames to correct the current frame. As noted above, it is not necessary to decompress the dark columns, as their values should always fall in the linear range of the compression/decompression curve.

The present invention averages the second (rightmost) of the two dark columns and subtracts this value from all pixels in the image. It is important to use only the rightmost dark column, as optical and/or electrical crosstalk from the active pixel array can be present in the first dark column.

In another embodiment of the present invention, one half of the value, instead of the full value, is subtracted from all pixels in the image to reduce the visibility of a sensor defect: non-uniform dark current, specifically an elliptical ring of high dark current near the edges of the sensor. This non-uniform dark current causes the dark current in the shielded columns to be much higher than at the center of the imager.

Removing the dark column average or cutting the dark column average in half depending upon the type of imager used, as described above, substantially prevents this effect from causing clipping of valid image data in low-light scenes. Moreover, removing a fraction, such as ½, of the dark current data can compensate for nonlinearities in dark current across the sensor array.

The image data remapping subsystem 80 may further include a crosstalk reduction process. As noted before, as illustrated in FIG. 6, the crosstalk reduction process may be performed upon the decompressed digital image data or upon the compressed digital image data prior to decompression as illustrated in FIG. 5.

The present invention applies a 3×3 highpass FIR filter to the digital image data to remove electrical crosstalk between sensor elements. The digital image data may be logarithmically compressed or decompressed, as noted above. An example of the filter coefficients for 3×3 highpass FIR filter are:

$$\begin{bmatrix} 0 & -0.0625 & 0 \\ -0.0625 & 1.25 & -0.0625 \\ 0 & -0.0625 & 0 \end{bmatrix}$$

It is noted that that these coefficients can be derived from empirical measurements. Also, different coefficients may be used for different pixel coordinates in the Bayer color filter pattern.

After the digital image data decompressed, the digital image data is compensated for lighting conditions and sensor color responsivity.

To compensate for lighting conditions and sensor color responsivity, the present invention finds the average red, green, and blue values of the image. This information is used later to rebalance the image values and compensate for varying lighting conditions.

For a VGA imager being used to produce a still image, in a preferred embodiment of the present invention, the white balance process samples every fourth 2×2 pixel block, or Bayer tile, in both the horizontal and vertical directions. From each such Bayer tile, the present invention, with respect to still image capture, chooses one sample associated with a green color dimension, one sample associated with a red color dimension and one sample associated with a blue color dimension. It is noted that the present invention excludes the lower-left-hand green sample of each Bayer tile, though the location of the green sample that is excluded is non-essential, as long as one green sample within the Bayer tile is excluded.

With respect to a VGA imager the total number of Bayer tiles is 640/2=320 in the horizontal dimension and 480/2=240 in the vertical dimension. In one embodiment of the present invention, with respect to still image capture, every fourth such tile is used, or 320/4=80 in the horizontal dimension and 240/4=60 in the vertical dimension. Therefore the total number of Bayer tiles the present invention chooses, with respect to still image capture, is 80*60=4,800. From each such tile, the present invention uses three pixels as described above, or 3,600*3=10,800 pixels out of a total of 307,200 pixels.

In another embodiment of the present invention, with respect to still image capture, uses every 2×2 Bayer tile in the averaging process.

On the other hand, with respect to video image capture, the present invention uses every 2×2 Bayer tile in the averaging process. With respect to a VGA imager being used to produce a video capture, there are 320*240=76,800 Bayer tiles. From each such tile, the present invention uses three pixels as described above, or 76,800*3=230,400 pixels out of a total of 307,200 pixels.

The pixel data is accumulated for each channel. Since only the relative values among the channels are of interest, after accumulation the least significant 19 bits of the accumulators can be eliminated without significant loss of information when utilizing the present invention in conjunction with a VGA imager.

To achieve the best results, the value $2^{18}$ should be added to the accumulators at initialization or before shifting the results right at the end. This will cause the shift operation to round the fixed-point number rather than truncate it.

The computed average red, green, and blue values are used to create a set of three scalar adjustments to the Bayer image data. The adjustment factors are constrained to plausible lighting conditions ranging from daylight to fluorescent to prevent overcompensation on images that have large regions of similar hue. An example of boundaries or constraints for the adjustment factors is graphically illustrated in FIG. 4.

Figure 4:
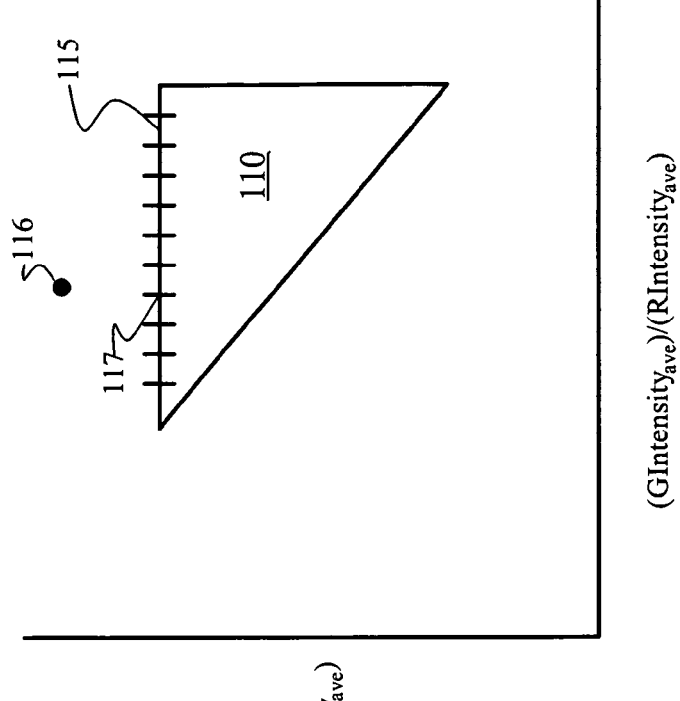
FIG. 4 graphically illustrates constraints for providing white balance compensation according to the concepts of the present invention.

As illustrated in FIG. 4, a triangular boundary 115 is created which represents the plausible lighting conditions ranging from daylight to fluorescent. Each side of the boundary is divided up into a plurality of discretized points. In a preferred embodiment, if an adjustment value 116 falls outside the boundary 115, the adjustment value 116 is snapped to the closest discretized point, in this example, discretized point 117. The adjustment value 116 could also be snapped to the closest corner of the boundary 115. It is noted that the boundary 115 may be any shape that represents the plausible lighting conditions ranging from daylight to fluorescent.

This adjustment process is accomplished using the ratios G/R and G/B, where R, G, and B are the average values computed above. The present invention sets adjustment factors for the three color channels as shown below.

$f_R$=max(min((G/R), 1.2), 0.4)

$f_G$=1.0

$f_b$=max(min((G/B), 2.0), 1.0)

Finally, the present invention normalizes the scale factors $f_R$, $f_G$, and $f_b$ by the smallest factor to ensure that the correction process always gains data. The result is that a few more pixels are clipped to white in bright scenes, but sensitivity in dark scenes is not compromised and areas with saturated pixels do not acquire a false color cast.

The red, green, and blue adjustment factors determined above are applied to both the still image capture and video image capture applications. There is a one-frame delay, when utilized in a video image capture embodiment, in the pipeline in order to avoid frame buffering, so parameters from frame N will be used to correct frame N+1. This should be imperceptible, as lighting conditions tend to change slowly and continuously. It is desirable to use adjustment factors averaged from many frames to compensate the current frame, in order to smooth the adjustment from one lighting condition to another.

A maximum value is taken across the full image. As each pixel is scaled by the appropriate scale factors $f_R$, $f_G$, or $f_b$, the pixel is then clipped to at most the maximum value of the previous frame. This prevents white areas of the image from shifting color.

In a further embodiment, the present invention, with respect to video image capture, uses every 2×2 Bayer tile in the averaging process. With respect to a VGA imager being used to produce a video capture, there are 320*240=76,800 Bayer tiles. From each such tile, the present invention uses all four pixels as described above or a total of 307,200 pixels, wherein the two green pixels are treat as different colors so that "picnic blanket noise" or "V-level difference" artifacts can be reduced.

The pixel data is accumulated for each channel (R, B, G, and G*). Since only the relative values among the channels are of interest, after accumulation the least significant 19 bits of the accumulators can be eliminated without significant loss of information when utilizing the present invention in conjunction with a VGA imager.

To achieve the best results, the value $2^{18}$ should be added to the accumulators at initialization or before shifting the results right at the end. This will cause the shift operation to round the fixed-point number rather than truncate it.

The computed average R, G, G*, and B values are used to create a set of four scalar adjustments to the Bayer image data. The adjustment factors are constrained to plausible lighting conditions ranging from daylight to fluorescent to prevent overcompensation on images that have large regions of similar hue.

This adjustment process is accomplished using the ratios G/G*, G/R, and G/B, where R, G, G*, and B are the average values computed above. The present invention sets adjustment factors for the four color channels as shown below.

$f_R$=max(min((G/R), 1.2), 0.4)
$f_G$=1.0
$f_G$*=G/G*
$f_b$=max(min((G/B), 2.0), 1.0)

Finally, the present invention normalizes the scale factors $f_R$, $f_G$, $f_G$*, and $f_b$ by the smallest factor to ensure that the correction process always gains data. The result is that a few more pixels are clipped to white in bright scenes, but sensitivity in dark scenes is not compromised and areas with saturated pixels do not acquire a false color cast.

The red, green, and blue adjustment factors determined above are applied to the Bayer image data to both the still image capture and video image capture applications. There is a one-frame delay, when utilized in a video image capture embodiment, in the pipeline in order to avoid frame buffering, so parameters from frame N will be used to correct frame N+1. This should be imperceptible, as lighting conditions tend to change slowly and continuously. It is desirable to use adjustment factors averaged from many frames to compensate the current frame, in order to smooth the adjustment from one lighting condition to another.

A maximum value is taken across the full image. As each pixel is scaled by the appropriate scale factors $f_R$, $f_G$, $f_G$*, or $f_b$, the pixel is then clipped to at most the maximum value of the previous frame. This prevents white areas of the image from shifting color.

In a variation of the white balancing routine described above, an other embodiment of the present invention includes the addition of a cutoff to stop the white balance adjustment in low-light conditions so as to prevent continuous fluctuation of the white balance.

The cutoff value uses either the average value of the whole image, or the average value of each of the color channels in the image. When the whole image average, or some combination of the color channel averages, drops below a specified value; e.g., 8 on a scale of 0-255; the white balance adjustment stops. Below an even lower value; e.g., 4 on a scale of 0-255; the white balance will return to its default state: fR=fG=fG*=fB=1.0. In this case, no gain is applied to any color channel.

The transition to the default state is smoothed out with a lowpass filter so that it does not appear as an abrupt change in the appearance of the video image.

After completing the white balancing routine, the image data can be remapped into pixel of a lesser number of bits. If the image data is to be displayed on an 8-bit or 10-bit display device, the processing pipeline SNR is limited by quantization noise at the display, rather than pixel noise. Therefore, it is possible to use fewer bits for processing the image data after the white balance process is realized.

The remapping process of one embodiment of the present invention, with respect to the still image capture application, subtracts the minimum (black point) in the image from all the pixels, then scales the image to a smaller number of bits using the following equation:

$pixel_{out}$=(($pixel_{in}$-$min_{in}$)*$max_{out}$)/($max_{in}$-$min_{in}$)

The remapping process of the present invention, with respect to the video image capture application, does not subtract the minimum (black point) in the image from all the pixels, but only scales the image to a smaller number of bits using the following equation:

$pixel_{out}$=(($pixel_{in}$*$max_{out}$)/($max_{in}$))

To suppress point noise, the present invention uses a 3-point horizontal median filter to determine the value $max_{in}$.

It is noted that the present invention enforces $max_{in} \geq max_{out}/4$ or else color noise will be accentuated to an unacceptable level. The present invention also enforces $min_{in} \leq max_{in}/4$ to prevent overstretching the histogram of scenes with a small range of luminance values, such as a plain white wall.

In another embodiment of the present invention, the remapping process is modified to handle situation using a human viewer where it is desirable to saturate a small fraction; e.g. 1%; of the pixels in each scene. This increases scene contrast and may reduce the amount of non-linear gain applied when controlling exposure.

According to this embodiment of the present invention, in dark conditions, it is necessary to apply digital gain to the sensor data in order to ensure a visible image although noise is gained along with the signal. Therefore, the present invention also performs automatic gain control to improve dark scene responsivity. The maximum gain limit is 8-10 times with conventional sensors, but this could be increased with reductions in sensor noise.

The present invention scales the 20-bit input data to a 12-bit output range for subsequent processing. In this embodiment, the multiplication operation actually produces a 13-bit result which is saturated above $2^{13}-1=8191$. The extra bit of internal precision allows the present invention to generate a histogram with data above and below the desired output white point of 4095. To keep the memory and area requirements reasonable, the present invention does not use a full 8192-bin histogram. Instead, the present invention, uses a smaller number of bins, B; e.g., 256; which move within the 13-bit space according to the scene parameters.

The histogram not only moves around within the input space, but the relationship between the 13-bit data and the bins changes depending on the maximum 13-bit result value of the previous frame $max_{N-1}$. This allows precision to be dynamically traded off against the range of data that can be measured. When the maximum value is close to the white point, the present invention focuses the histogram bins on the area close to the white point for maximum precision. However, when the maximum value is far from the white point, the present invention increases the range of the bins at the expense of precision, putting 2, 4, 8, or more gray values into each bin so that the present invention can quickly move toward the correct exposure.

Given a number of bins, B, let b=B/2. The scaling of the histogram bins is decided as follows:

$\Delta_c = |max_{N-1} - WP|$ scale=$\lfloor (\Delta_c)/b \rfloor$ shift=$\lfloor \log_2(\max(scale,1)) \rfloor$ It is noted that shift is expressed in terms of bits, and can also be computed by finding the highest set bit in $\Delta_c$ and comparing it to the highest set bit in b−1. For example, if B=256, b=128, and max$_{N-1}$ is greater than or equal to 128 gray values away from WP, each bin will hold two gray values. Moreover, if B=256, b=128, and max$_{N-1}$ is greater than or equal to 256 gray values away from WP, each bin will hold four gray values.

Upon finding the above values, the present invention can reduce the data space from 13 bits to (13-shift) bits and find the center point C' for the histogram within the reduced data space. All variables in the reduced data space will be denoted with a "prime" symbol. When max$_{N-1}$ is greater than or equal to WP, the center point C' is simply the white point in the reduced data space WP'=$2^{-shift}$WP.

However, when max$_{N-1}$ is less than WP, the present invention allows the center point to move between the white point WP' and WP'/2. This ensures that the controller makes maximum use of the histogram bins in dark scenes without becoming stuck at non-optimal solutions in bright scenes. Therefore the center point is:

$$C' = \begin{cases} \max(b, ([(\max_{N-1})/(2^{shift})]-b)) & \max_{N-1} < WP \\ WP' & \max_{N-1} \geq WP \end{cases}$$

Now, the present invention generates a histogram for the incoming frame data. For each sample x, the present invention finds x'=$[2^{-shift}x]$ and increments the bin i' given by:

$$i = \begin{cases} 0 & x' \leq C' - b + 1 \\ B - 1 & x' > C' + b \\ x' - C' + b - 1 & \text{otherwise} \end{cases}$$

Once the histogram is generated, the present invention finds the bin i'$_W$ such that no more than 1% of the pixels (i.e., no more than 3072 pixels for a VGA sensor) are in the bin(s) above i'$_W$. However, if bin B−1 has greater than or equal to 1% of the pixels, the present invention uses i'$_W$=B−1, and similarly if bin 0 has greater than 99% of the pixels, the present invention use i'$_W$=0. The exposure will not be optimal on the subsequent frame, but it will approach the correct solution. The desired white point in the reduced data space W' is therefore:

$$W'=i'_W+C'-b+1$$

If the desired white point W' is higher than WP', the gain is too high to correctly expose the scene. Conversely, if the desired white point is too low, the scene is not being gained enough for proper exposure. The present invention adjusts the gain factor for the next frame to improve the exposure of the scene:

$$f_{N+1}=\max((WP/\text{clip}_{in}),\min(f_{max},f_N(WP'/(\max(W',1)))))$$

The fractional part of the above equation can range from 4095 (W'=1) to slightly less than 0.5 (W'=8191). This requires a divider with a precision matching f$_N$ including both integer and fractional bits. A minimum gain limit of WP/clip$_{in}$ ensures that saturated pixels at the input remain saturated at the output, while the maximum gain limit prevents gaining up noise below a certain signal-to-noise threshold. After f$_{N+1}$ is generated, the value is IIR lowpass filtered.

The 12-bit output data is computed from the 13-bit internal results by saturating all values to no more than 4095. The present invention can also easily find clip$_{out}$=min (f$_N$·clip$_{in}$, 4095).

It is noted that if the center of the histogram is allowed to go above WP', a problem may occur when the maximum value max$_{N-1}$=WP+B−1 so shift=0 and WP=WP'. If bin 0, which is located at WP, contains more than 1% of the pixels solely because it includes all the pixels valued less than or equal to WP, the controller must conclude that the desired white point W is 4095. This implies that the current gain factor is correct even though less than 1% of the pixels in the output image are actually saturated. The controller will remain stuck at this point until max$_{N-1}$ changes. This problem can be overcome by forcing the histogram to extend below WP, but there is no advantage in precision from the increased center point.

In a variation of the above histogram-based method for finding max$_{in}$, the present invention uses a fixed number of bins "b" below and above the desired white point WP instead of adjusting the histogram bin scaling. Each bin represents a single gray level, not multiple gray levels as in the histogram-based method described above. Thus, the present invention fixes scale=1, which flows through the equations, implying shift=0, C'=WP'=WP, x'=x, etc.

The advantage to this alternative approach is that it is simpler to implement and requires less hardware logic than the histogram-based method described above; however, it may adjust more slowly and require more memory than the histogram-based method described above.

As noted above, when the gamma code drops, it causes more pixels to become saturated and causes a visible discontinuity that is highly undesirable. The present invention prevents or minimizes this effect.

When the adaptive sensitivity control system of the present invention detects that the gamma code should drop, instead of immediately effecting the change, the present invention signals the linear remap controller. The linear remap controller looks up the value of clip'$_{out}$ for the new gamma code γ'$_c$ from the decompression system and subtracts the prevailing average dark current to produce a target white point clip'$_{in}$. The present invention overrides the gain factor lowpass filter input, normally f$_{n+1}$, with the value WP'/clip'$_{in}$.

This causes the linear remap controller to converge toward a lower output dynamic range matching the lower input dynamic range of the new γ'$_c$. Once the filter output has settled to a value near WP'/clip'$_{in}$, the present invention allows the gamma code to decrease. Due to pipeline delays, the present invention holds the filter input at WP'/clip'$_{in}$ for one additional frame so that the normal f$_{n+1}$ computation can settle. If the adaptive sensitivity control system of the present invention deasserts the "decrease desired" signal, the linear remap controller must resume normal operation on the next frame boundary.

For example, in a conventional device, when the gamma code decreases, the system immediately jumps to a cut-off value and then slowly transitions to the proper value as the linear remap block compensates for the reduced input dynamic range by lowering the output dynamic range. On the other hand, according to the concepts of the present invention, the output image will transition smoothly to the proper value without the immediate jump. After decreasing the gamma code, the output should remain very similar because the input and output dynamic ranges have already been matched.

Upon completion of the image data remapping, the remapped image data is received by the color image processing subsystem 90. Initially, in a preferred embodiment of the present invention, the color image processing subsystem 90 color filter interpolates the image data.

In the color filter interpolation process, a M×N edge-detecting interpolation for video image capture or for still image capture is used to infer R, G, and B information for each pixel from the surrounding samples in the Bayer pattern. This triples the size of the data from 12 bits per pixel to 36 bits per pixel. The M×N edge-detecting I='123terpolators; e.g. a 3×5, 5×5, or 7×7 edge-detecting interpolator; achieve greater sharpness by avoiding interpolation across luminance edges, preferring to interpolate along gradients in the local area. The filter of the present invention also reduces the need for false color suppression later in the pipeline, due to reduced Bayer filter artifacts along sharp near-vertical and near-horizontal edges.

Next, the present invention applies a fixed-coefficient 3×3 matrix to the color components of each pixel to compensate for the response curves of the sensor and filter materials. The matrix corrects for any minor hue, saturation, or other defects. A brief description of the color filter interpolation process of the present invention will be set forth below. A more detailed description is set forth in U.S. Pat. No. 6,421,084. The entire content of U.S. Pat. No. 6,421,084 is hereby incorporated by reference.

In color filtering interpolation process of the present invention, it is noted that only a single color value is associated with each pixel location. Thus, the goal of the color filtering interpolation process is to recover the missing color values at each location, given only a single color value at each location.

Using the M×N edge-detecting interpolation for still image capture as the basis for this description, a M×N array of pixels of the image plane, each pixel storing a color value for a single color; e.g., red, green, and blue (RGB); is provided such that the green pixels are arranged along one diagonal of the array, and the red and blue pixels are arranged along the other diagonal. The pixel under consideration, the center pixel of the M×N array, is green. Therefore the missing color values are blue and red for that pixel. As the M×N array traverses the image plane, the center pixel will vary from between green, blue, and red. Thus, the goal is to recover the missing color values for the center pixel of the M×N array.

For each pixel, the missing color components are found as follows. First, a set of gradients is determined from the neighboring color values in the M×N array centered at a particular pixel. Each gradient corresponds to a different direction.

Second, for each set of gradients, a threshold value is determined, and the threshold is used to select a subset of gradients. Low valued gradients are preferred because low valued gradients indicate pixels having similar color values. High gradients would be expected in regions of the image where there are many fine details, or sharp edges.

Third, the subset of gradients is then used to locate regions of pixels that are most like the pixel under consideration. Note, here the pixels in the identified regions can be in different directions from the pixel under consideration. The pixels in the regions are then weighted and summed to determine the average difference between the color of the actual measured center pixel value and the missing color.

Using the case in which the pixel under consideration is green, and the missing value is blue, the color filtering interpolation process of the present invention will be described further. Note that there are six separate cases, all of which use the same conceptual process. (Case 1: consider green, missing blue; Case 2: consider green, missing red; Case 3: consider blue, missing green; Case 4: consider blue, missing red; Case 5: consider red, missing green; and Case 6: consider red, missing blue.)

To recover all of the missing color values in the image would require the application of the following. For each green pixel, Cases 1 and 2 must be performed. For each blue pixel, Cases 3 and 4 must be performed. For each red pixel, Cases 5 and 6 must be performed. All six cases are solved in a similar manner.

Again using Case 1 as an example, the first step is to determine a set of gradients. In the preferred implementation, a set of four gradients, although that number can be changed, is considered. To determine the gradients, the present invention weights and sums the absolute values of the differences between pairs of similar-colored pixels.

The second step is to determine a threshold and select a subset of gradients. In the preferred implementation, the present invention determines a threshold as follows. Let the maximum gradient value be denoted as Max, and let the minimum gradient value be denoted as Min. Then the present invention determines the threshold, T=(1.5*Min)+ (0.5*(Max+Min)). Using the threshold value T, a subset of gradients is selected such that all gradients in the subset are less than the threshold T.

The third step is to locate pixels in the regions corresponding to the subset of gradients, and to use those pixels to determine a color difference. The present invention determines the total color value for each color in the gradient subset regions, each gradient subset region having only two colors. Then, the difference between the two total color values is divided by the number of gradients in the threshold subset to produce a normalized color difference. This difference is added to the pixel value under consideration to produce an estimate for the missing color value. It should be apparent that other formulations could be used to determine the threshold values used for selecting interpolation directions. What is important here is that interpolation is based on pixels in a region defined by multiple directions.

After color correction, the image data is processed by an exposure control operation. The goal of the exposure control operation is to determine how best to utilize the 256 intensity levels of a video display or monitor to represent the wide dynamic range data captured by the imager. This is challenging enough, but it must also present an image with acceptable contrast and color saturation. It should not be surprising that the exposure control operation is therefore the most complex and important part of the pipeline.

The present invention assumes that the viewer is most interested in the center portion of the image, so that region should weigh more heavily in the computation. The present invention also assume that large regions with similar luminance are more important than small regions with wildly varying luminance, especially if the small regions fall outside the center region. Unlike conventional imagers, the present invention does not "blow out," or clip, extreme regions, but allocates fewer gray levels to them.

To begin the exposure control operation, a grey value has to be found. In determining the grey value, a preferred embodiment of the present invention first finds the average luma for a predetermined region of the imaged scene. It is preferred that a center region of 256×256 is used.

In another embodiment of the present invention, the present invention first finds the average luma for each of nine regions of the imaged scene. It is noted that the number of regions can be, for example, two, five, or fifteen, as there are numerous ways and patterns that can be used to subdivide an image to find the optimal gray level of the subject being imaged.

If nine regions are used to subdivide an image to find the optimal gray level of the subject being imaged, it is preferred that the center region is 256×256 and the other regions are not a power of two in size. By establishing the regions in such a matter, the average cannot be computed solely by shifting right the accumulated value for each region. Therefore, the present invention subsamples each region by differing amounts so that the accumulators need only be shifted right at the end.

Once the region averages are computed, the region averages are put in an array A, with the center value occurring twice. Let M be the mean of A. The present invention then computes the array of absolute differences between each element of the array and the mean, $|\epsilon|=|A-M|$.

The present invention also determines the squared differences between each element and the mean, $\epsilon^2=(A-M)^2$. Lastly, present invention finds $\eta=\max(\epsilon^2)$, which is the largest squared difference between any element of A and the mean M.

A region i will, be excluded from consideration if $\epsilon^2>\eta/2$ and the absolute value of $\epsilon_i$ is greater than 128. Thus, the present invention excludes regions that are extremely outside the norm for the overall scene from consideration when determining the power curve that will map time image to the display. The effect is to prevent small, extreme-valued regions from influencing the allocation of gray levels to the majority of the image, especially when the extreme values fall outside the center region.

In this embodiment of the present invention, the present invention has now tagged each region's average value as included or excluded. The present invention then averages all of the $A_i$ tagged as included to give a grey value GV for the image. This gray value GV is the value that is remapped to 50% luminance in the final 8-bit output.

Now that the present invention has established, through the utilization of a single region or through the utilization of nine regions, the target gray value GV, the present invention must determine which power curve to use to remap the targeted gray value to 50% output luminance on the display. It is noted that as the captured image becomes darker, the targeted gray value is mapped to a greater percentage of output luminance. However, simply choosing an arbitrary power curve and implementing a floating point power function would require far too much hardware to be feasible, and would cause undesirable results in some corner cases.

Therefore, the present invention uses a small set of power curves implemented as lookup tables. The present invention further limit the range of power curves based on the compression curves determined by the imager, as discussed above. Finally, the present invention constrains the range of power curves even further for dark images to prevent excessive noise amplification.

Given the determined gray value GV, in a preferred embodiment of the present invention, the present invention looks up the appropriate power curve by comparing against 48 breakpoints. If GV>1961, the present invention uses a special routine wherein all pixel components are multiplied by 0.0625, which converts linearly from 12-bit to 8-bit pixels.

The present invention also simultaneously looks up minimum and maximum power curves from a pair of tables indexed by the original compression curve determined by the imager. The power curve chosen above is limited to the range of these minimum and maximum power curves. This prevents the gray value-based process from over-brightening or over-darkening images and helps to preserve contrast and saturations.

In a preferred embodiment of the present invention, a lookup table implements the chosen power curve wherein the lookup table is indexed by the identity of the chosen power curve and the luma value of each pixel to be remapped. An approximation to luma can be used in this process.

The look up table outputs, corresponding to the identity of the chosen power curve and the luma value of each pixel to be remapped, a 14-bit corrective factor with three integer bits and eleven fractional bits. This corrective factor is multiplied by each of the three color channels to produce a result that can be divided by 128 to obtain a 12-bit output value (a fixed point number with eight integer and four fractional bits, or "8.4"), the remapped luma value for that pixel.

In one embodiment of the present invention, once the 8.4-bit component values have been created, the present invention finds the minimum luma value $BP_{absmin}$ for the frame. The present invention also performs a histogram operation on the 8 integer bits. The present invention finds a black threshold luma value B that is associated with a histogram bin wherein no more than 0.33% to 10% of the pixels, but preferably 0.625% to 10% of the pixels, (i.e. 1024 to 30,720 pixels for a VGA imager) as the scene becomes darker are in the bin(s) below the black threshold luma value B bin.

In a preferred embodiment of the present invention, the present invention then multiplies the black threshold luma value B by 16 to make it an 8.4 number and clips the black threshold luma value B to at most 1023. If the minimum luma value is greater than the clipped black threshold luma value, the present invention clips the minimum luma value to at most 1023. Otherwise, present invention uses the black threshold luma value as the ideal black point BP.

BP=min(max($BP_{absmin}$,min(16B, 1023)), 0.33% to 10% of pixels, but preferably 0.625% to 10% of the pixels, in the imager as the scene becomes darker)

or equivalently

BP=max(min($BP_{absmin}$, 0.625% to 10% of pixels, but preferably 0.625% to 10% of the pixels, in the imager as the scene becomes darker), min(16B, 1023))

The white point is set by using the same 256-bin histogram generated for the black point. The present invention finds a preliminary white point value $WP_{hist}$ that is associated with a histogram bin wherein no more than 1% of pixels (i.e. no more than 3072 pixels) are in the bin(s) above the preliminary white point value $WP_{hist}$ bin.

The present invention then computes the minimum white point based on a linear remap scale factor, $\max_{out}/\max_{in}$. If the scale factor is less than 1, the minimum white point is 128. Otherwise, as the linear remap scale factor increases from 1 to 4, the minimum white point scales linearly from 128 to 191. The ideal white point WP used by restretch is the lesser of the minimum white point and the preliminary white point value $WP_{hist}$ found above (multiplied by 16 to make $WP_{hist}$ an 8.4 number).

A user-controlled contrast-enhancement mechanism can be implemented at this point. The user controls the black point offset amount β and the white point offset amount ω, which are treated as fractions of the range between the ideal black point BP and the ideal white point WP. To prevent undesirable results, the present invention enforces the invariants $\omega-\beta\geq 0.5$, $\omega\leq 1$ and $\beta\geq 0$.

The restretched white point $R_W$ and the restretched black point $R_B$ are given as:

$$R_W = \omega(WP-BP)_+ + BP$$

$$R_B = (WP-BP) + BP$$

The present invention then restretches the image. To do this, the present invention finds the luma value for each pixel, subtracts the black point value $R_B$, and multiplies by the stretch factor:

$$f_{restretch} = (4095)/(R_W - R_B)$$

to find a new luma value $\ddot{Y}$. The present invention then takes the difference $\Delta y = \ddot{Y} - Y$ and adds this difference to the three color channels. This has the effect of restretching the image histogram without significant effects on saturation. Finally, the present invention divides the resulting color channel values by 16 (with rounding) to find the 8-bit integer result. (If $f_{restretch}$ is implemented as a fixed-point number with n fractional bits, the present invention divides by $16 \times 2^n$ to remove both sources of fractional bits.)

In another embodiment, the present invention provides an alternative method for exposure control in view of the limitations of the power curve identification process, including the process' inaccurate modeling of perceived brightness and the use of discrete power curves. Perceived brightness is logarithmic, yet above the present invention averages in the linear domain, causing high dynamic range scenes in particular to appear too dark. The gamma-code-based table ID limits are an attempt to guide the exposure control in the correct direction. Using discrete tables leads to visible transitions in the output video stream when the controller changes table IDs.

In this embodiment, the present invention converts the linear luma values Y into a logarithmic domain of any base. Base 2 is particularly convenient because lookup tables for this base are easy to fit into power-2-size memories. The present invention then averages the log-luma values Y' and finds the log average $Y'_{ave}$ of the scene. If the present invention normalizes the log average, the present invention ensures that areas that are perceived by the eye as being at mid-range, or 50% brightness, appear properly exposed on the display.

First, the present invention converts the Y values into logarithmic Y' values independent of the input data range $P_{in}$. This could be done before taking the log of the Y values by computing $Y/P_{in}$, but it is simpler to take the log of both values and subtract instead. In base 2, $P'_{in}$ is the number of integer bits in the input data.

$$Y' = \log_2(Y+1) - P'_{in}$$

This process can be performed with a lookup table. Given 12 bit inputs and 16-bit precision (4.12 fixed point representation) within the block, the present invention needs just 8 KB of ROM for this process. Using these Y's, the present invention finds the log average. The desired average μ' in the chosen base, (independent of the input precision $P'_{in}$) is:

$$\mu' = \log_2(\mu+1) - P'_{in}$$

For the purposes of the present invention, this is equal to −1. In fact all input data will translate to numbers <0, so that it may be simpler to reverse the signs in the equations appropriately and treat the input data as if they were positive numbers.

It is noted that μ represents the "desired" average output value. Generally, this is assumed to be 128 out of 255 for 8-bit pixels, or 2048 out of 4095 for 12-bit pixels. This adjusts the image so that the average image brightness is in the middle of the display's available brightness levels. For most scenes and lighting conditions this produces what most people perceive as a "natural" image. However, for most output devices such as CRTs and photo prints, the desired average output value is slightly higher than ½ of the range of output values. On a CRT, one might set the desired average to 174 out of 255. This will cause the image to become a little over-brightened to compensate for the fact that the CRT will tend to make the picture appear darker.

The power function γ, the present invention needs to apply in order to properly expose the scene is simply:

$$\gamma = (\mu'/Y'_{ave})$$

However, this must be limited based on the gamma code at which the scene was exposed in order to prevent excessive nonlinear gain in dark conditions. Smaller values of γ will cause more nonlinear gain, so the present invention must limit the minimum power value.

Since γ depends on average data across the entire frame, there will be a delay of at least 1 frame before the new value takes effect. The present invention also smoothes the changes in γ over time by applying an IIR filter either to $\gamma_N$ or $2^{\gamma_N}$ in order to find $\gamma_{N+1}$ for the next frame.

Power functions tend to gain dark parts of a scene excessively, so the present invention imposes a maximum gain limit $f_{max}$; e.g. 4; which in base 2 is:

$$f'_{max} = \log_2(f_{max}) - P'_{out} + P'_{in}$$

Like $P'_{in}$, $P'_{out}$ in base 2 is the number of integer bits in the output data; e.g., 8.

Recalling that applying a power function is equivalent to multiplication in the log domain, the present invention uses the Y' values computed above to find a corrected luma value $Y'_{out}$ using the power γ and the gain limit $f'_{max}$:

$$Y'_{out} = \min(\gamma Y', Y' + f'_{max})$$

From $Y'_{out}$, the present invention derives a correction $\Delta'_Y = Y'_{out} - Y'$ which can be applied to the color channels. In the linear domain, this is the desired ratio between the input and output luma, which reduces to subtraction in the log domain.

The present invention converts the R, G, and B input values into $R'_{in}$, $G'_{in}$, and $B'_{in}$ values in the chosen base as was done for luma. Then the present invention can add the correction $\Delta'_Y$ to each of the color values $C'_{in}$, to find $C'_{out}$. The final output value for each color value, which can also be found with a lookup table, is:

$$C_{out} = 2^{(C'_{out} + P'_{out})}$$

Given 16-bit precision within the block and 12-bit fixed-point output data (8.4 representation), this table will be 96 KB.

The processed image data can then be sent to other subsystems to convert the image data into a proper color space, such as $Y'C_B C_R$ or CMYK, for displaying on a conventional display device or for reproduction by a printing system.

FIG. 5 illustrates a flowchart showing one embodiment of the image processing pipeline according to concepts the present invention. As illustrated in FIG. 5, the digital image data is initially processed using the various noise filtering routines described above, at step S1. After completing the various noise filtering routines, the digital image data is processed, at step S2, to remove dark current in the manner described above. Thereafter, at step at S3, crosstalk contamination is reduced in the digital image data. Upon completion of step S3, the digital image data is decompressed at step S4 using the decompression routine described above. The decompressed image data is compensated for with respect to white balance at step S5, in accordance with the detailed description given above. After completion of the compensation, at step S6, the image data is remapped utilizing the various processes described above. At step S7, the image data is color filter interpolated and then color corrected at step S8, according to the various routines described above. Lastly, the image data is subjected to exposure control at step S9 utilizing to the process described above.

FIG. 6 illustrates a flowchart showing another embodiment of the image processing pipeline according to concepts the present invention. As illustrated in FIG. 6, the digital image data is initially processed using the various noise filtering routines described above, at step S1. After completing the various noise filtering routines, the digital image data is decompressed at step S4 using the decompression routine described above. The decompressed image data is processed, at step S2, to remove dark current in the manner described above. Thereafter, at step at S3, crosstalk contamination is reduced in the digital image data. Upon completion of step S3, the image data is compensated for with respect to white balance at step S5, in accordance with the detailed description given above. After completion of the compensation, at step S6, the image data is remapped utilizing the various processes described above. At step S7, the image data is color filter interpolated and then color corrected at step S8, according to the various routines described above. Lastly, the image data is subjected to exposure control at step S9 utilizing to the process described above.

It is noted that each the processes discussed above and illustrated in FIGS. 5 and 6 receives a clip level input and produces a clip level output. If the process changes the value indicating a saturated pixel due to addition, subtraction or scaling of the pixel values, the clip level output is changed accordingly.

For example, the process for column fixed pattern noise correction receives raw data from the sensor, so the input value, in this example, 4095 represents a saturated pixel. Ignoring the gain correction aspect for the moment, the process for column fixed pattern noise correction simply adds and subtracts values to each column of the image data to cancel out column-to-column differences in the analog-to-digital converters.

Suppose the values applied to the image columns are:
+3−2+1−4+3−1

If there are any saturated pixels in the column marked "−4," the saturated pixels' value becomes 4095−4=4091. At the end of all the processing, the goal is to keep any pixel that was saturated on the sensor saturated (white) at the output. In this case, the clip level output of the column fixed pattern noise correction process would be 4091. All of the image data output by the column fixed pattern noise correction process would be clipped to at most 4091.

The precise computation of the output clip level for each process is described above in the corresponding section of the video image processing description.

While various examples and embodiments of the present invention have been shown and described, it will be appreciated by those skilled in the art that the spirit and scope of the present invention are not limited to the specific description and drawings herein, but extend to various modifications and changes.

What is claimed is:

1. A method of optimally utilizing a fixed set of intensity levels of a video display to represent a wide dynamic range data captured by an imager, comprising:
   (a) determining a target grey value;
   (b) determining a power curve from the determined target grey value;
   (c) limiting the determined power curve to a range of minimum and maximum power curves, the range of minimum and maximum power curves corresponding to an original compression curve utilized by the imager;
   (d) remapping a luma value of each pixel using the limited power curve;
   (e) determining a minimum luma value $BP_{min}$ for a frame of image data;
   (f) creating a histogram from the remapped luma values;
   (g) determining an ideal black point value BP and an ideal white point value WP from the created histogram and determined minimum luma value; and
   (h) restretching the image data, using the determined ideal black point value and an ideal white point value, to create new luma values for each pixel.

2. The method as claimed in claim 1, wherein the determination of the target grey value comprises finding an average luma for a predetermined region of an imaged scene.

3. The method as claimed in claim 2, wherein the predetermined region of the imaged scene is a center region of 256×256 pixels.

4. The method as claimed in claim 1, wherein the determination of the target grey value comprises finding an average luma for each of a predetermined number of regions of an imaged scene.

5. The method as claimed in claim 4, wherein one of the predetermined regions of the imaged scene is a center region of 256×256 pixels and the remaining predetermined regions of the imaged scene are regions not a power of two in size.

6. The method as claimed in claim 5, wherein the determination of the target grey value further comprises:
   (a1) storing luma average for each region in an array;
   (a2) computing a mean value for the array luma averages;
   (a3) computing an array of absolute differences between each element of the array and the computed mean;
   (a4) determining squared differences between each element and the mean;
   (a5) finding a maximum squared difference;
   (a6) excluding a region form determining the targeted grey value if the squared difference for that region is greater than the half the maximum squared difference and an absolute value of a difference between the luma value for that region and the computed mean value is greater than 128 so as to prevent small, extreme-valued regions from influencing an allocation of gray levels to a majority of the image; and
   (a7) determining the targeted grey value from averaging luma values from all non-excluded regions.

7. The method as claimed in claim 1, wherein the determination of the power curve from the determined target grey value further comprises:
   (b1) determining if the determined target grey value is greater than a predetermined value; and
   (b2) multiplying all pixels by a predetermined factor when it is determined that the determined target grey value is greater than the predetermined value.

8. The method as claimed in claim 1, wherein the determination of the ideal black point value BP from the created histogram and determined minimum luma value further comprises:
- (g1) determining a black threshold luma value B that is associated with a histogram bin wherein no more than 0.625% to 10% of the pixels as a scene becomes darker are in the bins below the black threshold luma value B bin;
- (g2) clipping black threshold luma value B to a predetermined value;
- (g3) determining the ideal black point BP to be BP=min (max($BP_{min}$, min(16B, 1023))).

9. The method as claimed in claim 1, wherein the restretching of the image data, using the determined ideal black point value and an ideal white point value, to create new luma values for each pixel further comprises:
- (h1) determining a black stretch point $R_B$ to be $R_B$=β (WP−BP)+BP wherein β is a black point offset value;
- (h2) determining a white stretch point $R_W$ to be $R_W$=ω (WP−BP)+BP wherein ω is a white point offset value;
- (h3) determining a new luma value by subtracting the black stretch point $R_B$ from the luma value for each pixel and multiplying the difference by $(K)/(R_W-R_B)$ wherein K is a predetermined constant; and
- (h4) calculating a difference between the new luma value and the old luma value and adding this difference the color channels so as to restretch the image data without significant effects on saturation.

10. The method as claimed in claim 9, wherein K is equal to 4095.

11. The method as claimed in claim 9, wherein β is a user controlled black point offset value and ω is a user controlled white point offset value.

12. A method of optimally utilizing a fixed set of intensity levels of a video display to represent a wide dynamic range data captured by an imager, comprising:
- (a) determining a target grey value;
- (b) determining a power curve from the determined target grey value;
- (c) converting luma values into logarithmic luma values, the logarithmic luma values being independent of an input data range;
- (d) determining a power function based upon a ratio between a desired logarithmic luma average and an actual logarithmic luma average;
- (e) determining a maximum gain limit;
- (f) determining a correct luma value;
- (g) determining a luma correction value from the correct luma value and the actual luma value; and
- (h) applying the luma correction value to each pixel input luma value to generate a corrected pixel input luma value.

13. The method as claimed in claim 12, wherein the correct luma value a minimum value between a product of the logarithmic luma value and the determined power function and a sum of the logarithmic luma value and the determined maximum gain limit.

* * * * *